US010578901B2

(12) United States Patent
Lee et al.

(10) Patent No.: US 10,578,901 B2
(45) Date of Patent: Mar. 3, 2020

(54) DISPLAY DEVICE

(71) Applicant: Samsung Display Co. Ltd., Yongin-si (KR)

(72) Inventors: Cheol Se Lee, Suwon-si (KR); Kyu Tae Park, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 113 days.

(21) Appl. No.: 15/724,817

(22) Filed: Oct. 4, 2017

(65) Prior Publication Data
US 2018/0307084 A1 Oct. 25, 2018

(30) Foreign Application Priority Data

Apr. 25, 2017 (KR) .......................... 10-2017-0052815

(51) Int. Cl.
*G02F 1/1333* (2006.01)
*G02F 1/1345* (2006.01)

(52) U.S. Cl.
CPC .... *G02F 1/133308* (2013.01); *G02F 1/13452* (2013.01); *G02F 2001/133314* (2013.01); *G02F 2001/133325* (2013.01); *G02F 2201/50* (2013.01); *G02F 2202/28* (2013.01)

(58) Field of Classification Search
CPC .......................................... G02F 2001/13456
See application file for complete search history.

(56) References Cited

U.S. PATENT DOCUMENTS

| 5,029,984 | A | * | 7/1991 | Adachi | ............... | G02F 1/13452 |
| | | | | | | 257/E25.011 |
| 2006/0109393 | A1 | | 5/2006 | Hsu et al. | | |
| 2014/0355195 | A1 | * | 12/2014 | Kee | ....................... | G06F 1/1616 |
| | | | | | | 361/679.27 |
| 2016/0161813 | A1 | | 6/2016 | Lee et al. | | |
| 2017/0059926 | A1 | * | 3/2017 | Kim | .................. | G02F 1/133512 |
| 2017/0017108 | A1 | | 6/2017 | Shin et al. | | |

FOREIGN PATENT DOCUMENTS

| KR | 1020100034349 | 4/2010 |
| KR | 1020150011731 | 2/2015 |
| KR | 1020170005341 | 1/2017 |

* cited by examiner

*Primary Examiner* — James A Dudek
(74) *Attorney, Agent, or Firm* — Cantor Colburn LLP

(57) ABSTRACT

A display device includes a first substrate and a second substrate facing each other, a plurality of pixels disposed between the first substrate and the second substrate, a plurality of conductive pads which transmits signals to the plurality of pixels, a flexible circuit film connected with the plurality of conductive pads, a protective film disposed on the flexible circuit film on lateral sides of the first substrate and the second substrate, and a chassis member disposed on the protective film on lateral sides of the first substrate and the second substrate.

20 Claims, 26 Drawing Sheets

DISPLAY DEVICE

This application claims priority to Korean Patent Application No. 10-2017-0052815 filed on Apr. 25, 2017, and all the benefits accruing therefrom under 35 U.S.C. 119, the content of which in its entirety is herein incorporated by reference.

BACKGROUND

1. Field

The invention relates to a display device.

2. Description of the Related Art

Recently, display devices such as a liquid crystal display ("LCD"), an organic light-emitting display ("OLED"), and the like have been actively developed.

Among the display devices, a liquid crystal display includes a liquid crystal panel in which a liquid crystal layer is interposed between two substrates arranged in parallel with each other, and a direction of an arrangement of liquid crystal molecules in the liquid crystal layer is changed by an electric field in the liquid crystal panel, so as to realize a difference in transmittance.

A backlight unit is disposed on one side of the liquid crystal panel to provide light to the liquid crystal panel. The provided light is viewed as a desired image to a user according to a control of transmittance of respective pixels disposed between the two substrates.

Recently, a display device tends to be thin and lightweight, and a width of a bezel of the display device has also been reduced. When the width of the bezel becomes narrower, advantages include not only excellent design, but also a reduced space between adjacent display panels occur when a large display device is manufactured using several display panels.

SUMMARY

There is a difficulty in realizing a display device having a thin bezel due to a wiring, a driving circuit, or the like located in a non-display area disposed to surround a display area in which an image is displayed.

Moreover, even when a display device having a thin bezel is realized, the durability of a wiring, a driving circuit, or the like located in the non-display area may be degraded due to a thin bezel, or a re-assembly of the display device may be difficult when a failure occurs.

An exemplary embodiment of the invention provides a display device that does not deteriorate the durability of a wiring, a driving circuit, or the like located in a non-display area, while realizing a thin bezel.

Another exemplary embodiment of the invention provides a display device that is easy to re-assemble when a failure occurs, while realizing a thin bezel.

According to an exemplary embodiment of the invention, there is provided a display device. The display device includes a first substrate and a second substrate facing each other, a plurality of pixels disposed between the first substrate and the second substrate, a plurality of conductive pads which transmits signals to the plurality of pixels, a flexible circuit film connected with the plurality of conductive pads, a protective film disposed on the flexible circuit film on lateral sides of the first substrate and the second substrate, and a chassis member disposed on the protective film on the lateral sides of the first substrate and the second substrate.

According to another exemplary embodiment of the invention, there is provided a display device. The display device includes a first substrate and a second substrate facing each other, a plurality of pixels disposed between the first substrate and the second substrate, a plurality of conductive pads which transmits signals to the plurality of pixels, a backlight unit disposed on one side of the second substrate facing the first substrate, and a flexible circuit film connected with the plurality of conductive pads, where the flexible circuit film and the plurality of conductive pads are attached by an anisotropic conductive film, and the flexible circuit film and the backlight unit are attached by an adhesive layer.

However, exemplary embodiments of the invention are not restricted to the one set forth herein. The above and other exemplary embodiments of the invention will become more apparent to one of ordinary skill in the art to which the invention pertains by referencing the detailed description of the invention given below.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
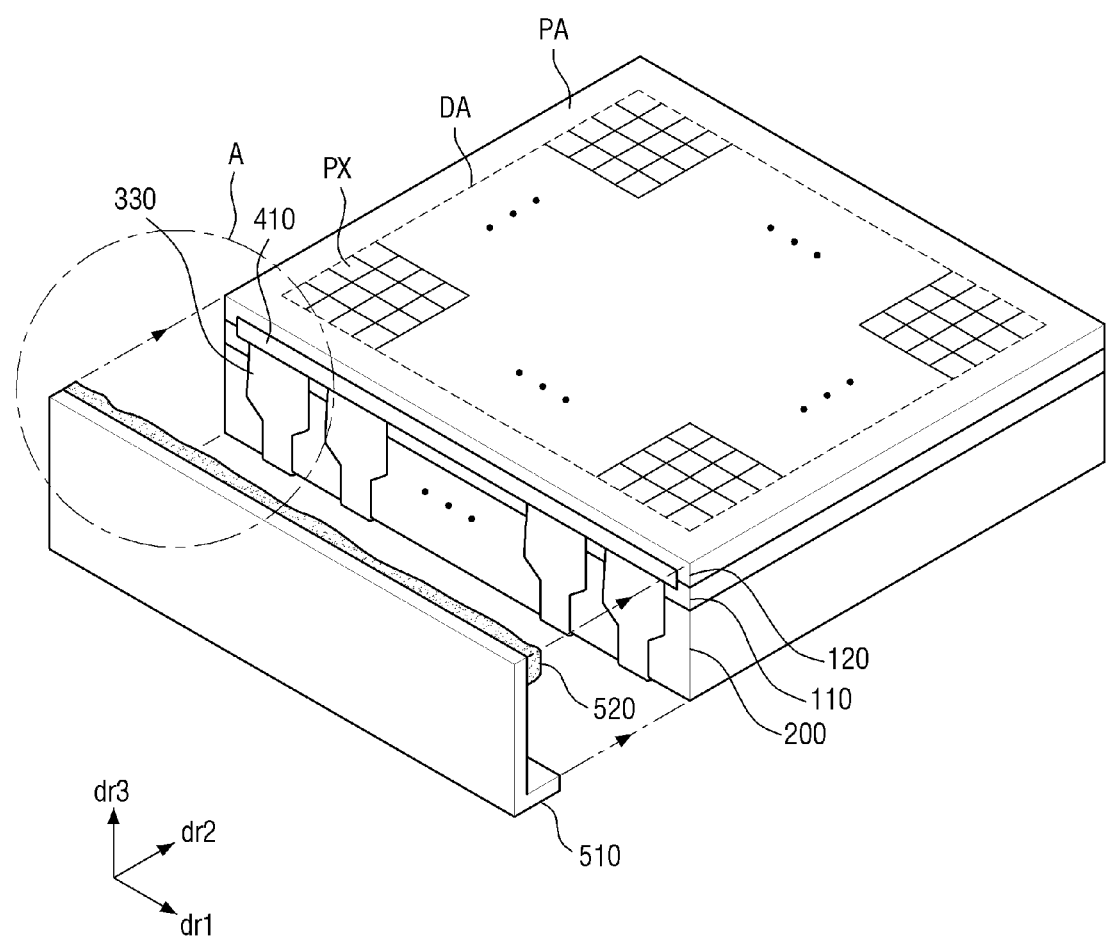
FIG. 1 is a perspective view of an exemplary embodiment of a display device according to the invention.

The invention will now be described more fully hereinafter with reference to the accompanying drawings, in which preferred exemplary embodiments of the invention are shown. This invention may, however, be embodied in different forms and should not be construed as limited to the exemplary embodiments set forth herein. Rather, these exemplary embodiments are provided so that this invention will be thorough and complete, and will fully convey the scope of the invention to those skilled in the art. The same reference numbers indicate the same components throughout the specification. In the attached drawings, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular exemplary embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, when the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). In an exemplary embodiment, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized exemplary embodiments. As such, variations from the shapes of the illustrations as a result, for example, of manufacturing techniques and/or tolerances, are to be expected. Thus, exemplary embodiments described herein should not be construed as limited to the particular shapes of regions as illustrated herein but are to include deviations in shapes that result, for example, from manufacturing. In an exemplary embodiment, a region illustrated or described as flat may, typically, have rough and/or non-linear features. Moreover, sharp angles that are illustrated may be rounded. Thus, the regions illustrated in the figures are schematic in nature and their shapes are not intended to illustrate the precise shape of a region and are not intended to limit the scope of the claims.

In the invention, an electronic apparatus may be any apparatus provided with a display device. Examples of the electronic apparatus may include smart phones, mobile phones, navigators, game machines, TVs, car head units, notebook computers, laptop computers, tablet computers, personal media players ("PMPs"), and personal digital assistants ("PDAs"). The electronic apparatus may be embodied as a pocket-sized portable communication terminal having a wireless communication function. Further, the display device may be a flexible display device capable of changing its shape.

Hereinafter, exemplary embodiments of the invention will be described with reference to the attached drawings.

Figure 2:
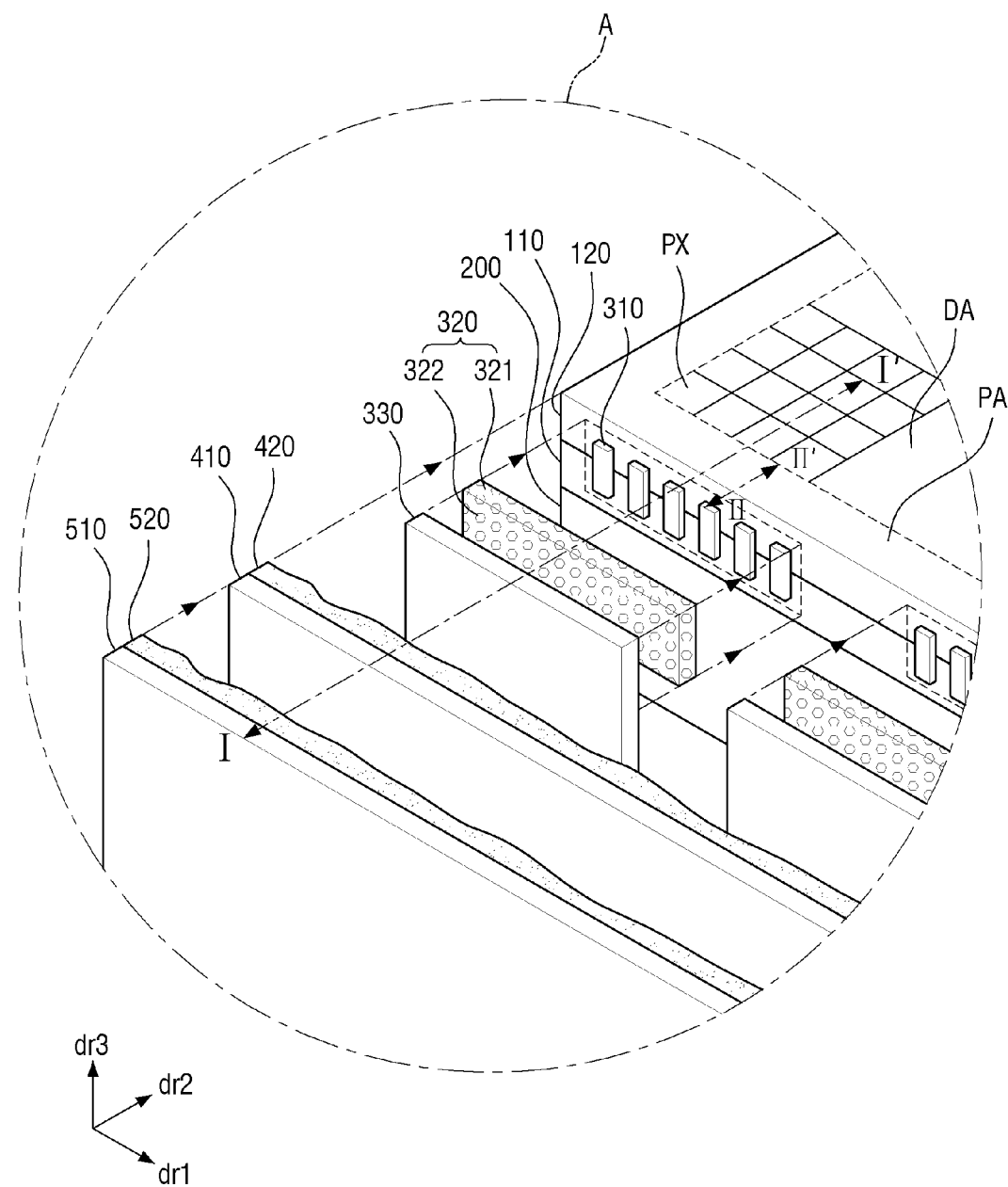
FIG. 2 is an enlarged perspective view of the area A of FIG. 1.
Figure 3:
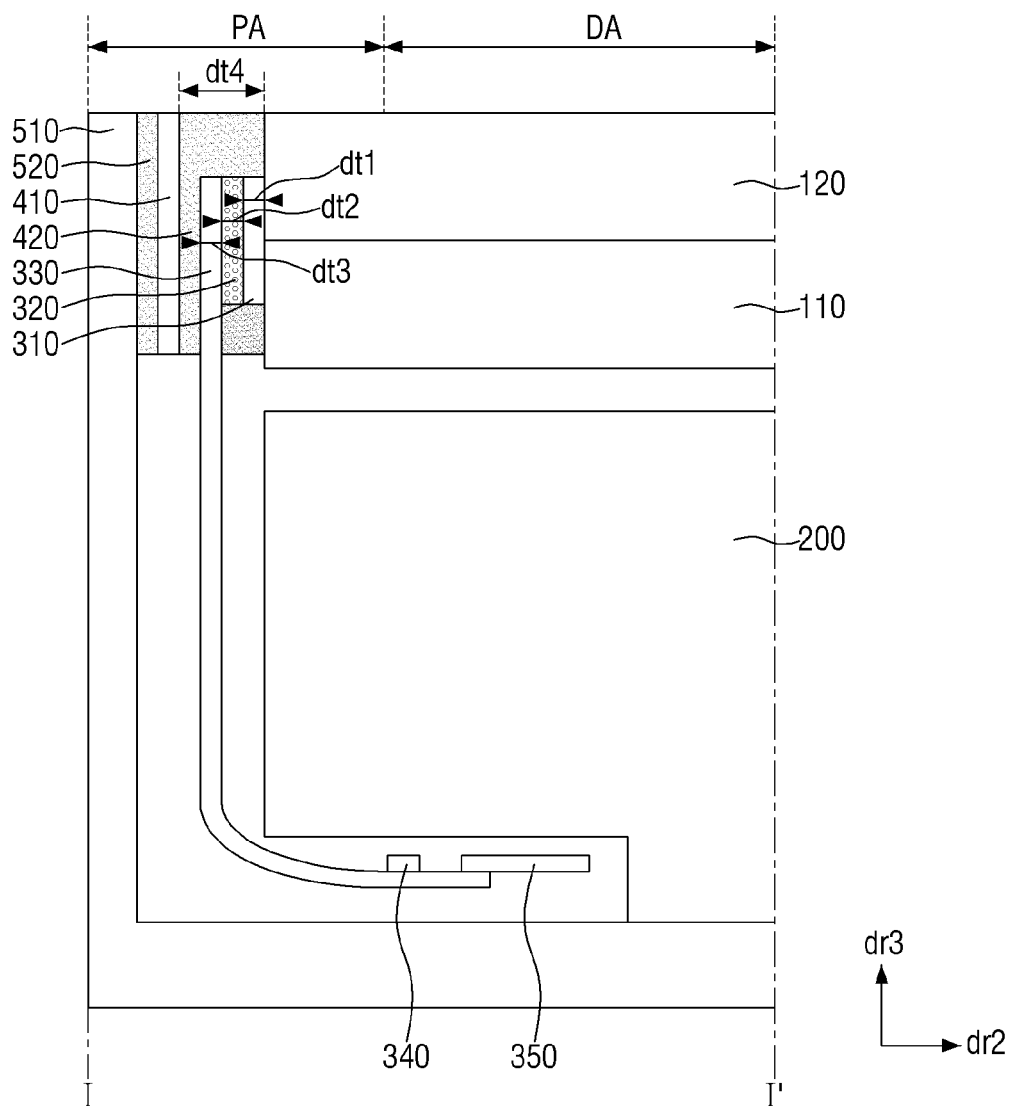
FIG. 3 is a sectional view taken along line I-I' of FIG. 2.
Figure 4:
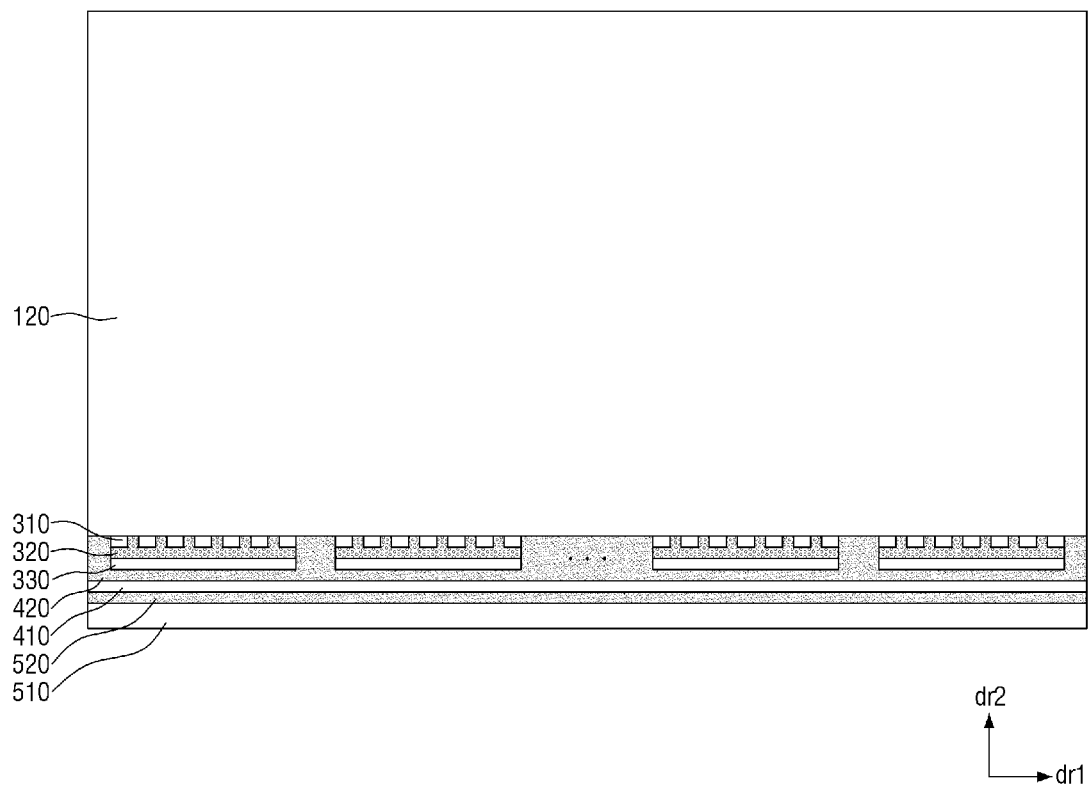
FIG. 4 is a plan view of the display device shown in FIG. 1 as viewed from above a second substrate.

FIG. 1 is a perspective view of a display device according to an exemplary embodiment of the invention, FIG. 2 is an enlarged perspective view of the area A of FIG. 1, FIG. 3 is a sectional view taken along line I-I' of FIG. 2, and FIG. 4 is a plan view of the display device shown in FIG. 1 as viewed from above a second substrate.

Referring to FIGS. 1 to 4, a display device according to an exemplary embodiment of the invention includes a first substrate 110, a second substrate 120, a backlight unit 200, a conductive pad 310, a flexible circuit film 330, a protective film 410, and a chassis member 510.

The second substrate 120 may be disposed to overlap the first substrate 110, and liquid crystal molecules (not shown) are injected into a space between the first substrate 110 and the second substrate 120 to form a liquid crystal layer (not shown).

The first substrate 110 and the second substrate 120 may be transparent insulating substrates. In an exemplary embodiment, the first substrate 110 and the second substrate 120 may be a glass substrate, a quartz substrate, a transparent resin substrate, or the like, for example. In other exemplary embodiments, the first substrate 110 and the second substrate 120 may be curved along one direction. In other exemplary embodiments, the first substrate 110 and the second substrate 120 may have flexibility. That is, the first substrate 110 and the second substrate 120 may be deformed by rolling, folding, bending, or the like, for example.

One side of the second substrate 120 facing the first substrate 110 may be divided into a display area DA and a non-display area PA. Here, the display area DA may be defined as an area in which an image to be displayed is actually displayed by dividing a plurality of pixels PX for displaying an image, and the non-display area PA may be defined as an area other than the display area DA.

The display area DA may be disposed in an area where the first substrate 110 and the second substrate 120 overlap each other. The plurality of pixels PX may be arranged in a matrix along the first direction dr1 and the second direction dr2 orthogonal to each other. In an exemplary embodiment of the invention, the plurality of pixels PX may indicate first to third pixels (not shown) respectively displaying a red color, a green color and a blue color, for example. In other exemplary embodiments of the invention, the pixels PX may include some of the pixels PX respectively displaying a yellow color, a cyan color, and a magenta color, for example. Moreover, the invention is not limited thereto, and the pixels PX may include a pixel PX displaying a white color, for example.

The pixel PX may be a basic unit capable of controlling independent gradation and displaying a specific color. Each of the pixels PX may control the gradation by adjusting the amount of incident light transmitted from the lower portion of the first substrate 110 to the upper portion of the second substrate 120.

Various components for driving the pixels PX, for example, the conductive pad 310, the flexible circuit film 330, the protective film 410, and the chassis member 510 may be provided in the non-display area PA. Moreover, a driving integrated circuit ("IC") 340, a printed circuit board 350, and the like may be disposed (e.g., mounted) in the non-display area PA, but the invention is not limited thereto, and may be provided as a separate module.

The non-display area PA has a shape surrounding the display area DA, but is not limited to an area on one side of the second substrate 120. That is, the non-display PA may include not only an area other than the display area DA on the second substrate 120 but also an area where components, for example, the conductive pad 310, the flexible circuit film 330, the protective film 410, the chassis member 510, and the like, protruding to the outer side of the second substrate 120 at a plan view facing the upper side of the second substrate 120, are arranged.

The backlight unit 200 is disposed on one side of the second substrate 120 facing the first substrate 110, that is, on one side of the second substrate 120 in the direction opposite to the third direction dr3. Here, the third direction dr3 may be a direction perpendicular to the first direction dr1 and the second direction dr2, and may correspond to directions shown in FIGS. 1 and 2.

The backlight unit 200 may include a reflective plate (not shown), a plurality of lamps (not shown), a diffusion plate (not shown), and a plurality of optical sheets (not shown). The plurality of lamps may be arranged on the reflective plate in parallel, and the diffusion plate and the plurality of optical sheets may be disposed on the plurality of lamps. However, in the exemplary embodiment, the configuration of these components will be omitted, and only the shape of the outer side of the backlight unit 200 will be shown.

The backlight unit 200 may provide light toward a direction in which the first substrate 110 is disposed, that is, in the third direction dr3, and the first substrate 110 and the second substrate 120, which are supplied with light from the backlight unit 200, may transmit light to the upper portion of the second substrate 120 by adjusting the amount of light. The transmitted light may be viewed as an image to a user.

The conductive pad 310 may receive various signals desired to drive the pixels PX, and may provide the signals to the first substrate 110 and the second substrate 120. That is, the conductive pad 310 may serve as a path for transmitting signals desired by various components for driving the pixels PX disposed on the first substrate 110 and the second substrate 120.

The conductive pad 310 is provided to protrude outward on one side of the first substrate 110 and the second substrate 120. Referring to FIG. 1, the conductive pad 310 is covered by a protective member, so that this conductive pad 310 is not visible from the outside. However, referring to FIG. 2, the conductive pad 310 is disposed on one side of the first substrate 110 and the second substrate 120 to extend in the third direction dr3. However, the specific shape, number and arrangement of the conductive pads 310 are not limited to those shown in FIG. 2, and may be variously changed depending on the number and kind of desired signals. Moreover, although it is shown that the conductive pad 310 is disposed on both the lateral side of the first substrate 110 and the lateral side of the second substrate 120, the invention is not limited thereto, and the conductive pad 310 may be disposed only on any one of lateral sides of the first substrate 110 and the second substrate 120.

The conductive pad may be disposed to overlap a signal line (not shown) that is disposed between the first substrate 110 and the second substrate 120 to be exposed to the outside, and may be printed and provided to be electrically connected with a signal line by contact with the signal line. The signal line is electrically connected with the pixels PX disposed between the first substrate 110 and the second substrate 120 or various elements for driving the pixels PX, so as to transmit a signal received from the conductive pad 310. In an exemplary embodiment, the conductive pad 310 may include a metal, for example, gold (Au), silver (Ag), or copper (Cu).

The flexible circuit film 330 is disposed on the lateral sides of the first substrate 110 and the second substrate 120 to overlap the plurality of conductive pads 310. The flexible circuit film 330 may include various signal lines (not shown) for transmitting signals, and the signal lines disposed in the flexible circuit film 330 may be electrically connected to the conductive pads 310. A plurality of the flexible circuit films 330 may be disposed along the lateral sides of the first substrate 110 and the second substrate 120, and the number of the flexible circuit films 330 may be determined depending on the number of driving chips (not shown). The flexible circuit film 330 may be electrically connected to the conductive pads 310, and may be disposed to extend to the lateral side of the backlight unit 200. The flexible circuit film 330 is attached to the conductive pads 310 by an anisotropic conductive film 320, and is electrically connected to the conductive pads 310.

The anisotropic conductive film 320 may include a polymer 321 and conductive particles 322 included in the polymer 321. The anisotropic conductive film 320 is disposed between the conductive pads 310 and the flexible circuit film 330 so that an electricity may flow between the conductive pads 310 and the flexible circuit film 330 through the conductive particles 322. Further, the anisotropic conductive film 320 has an adhesive force on both sides thereof, so that the conductive pads 310 and the flexible circuit film 330 may be attached and fixed on both sides of the anisotropic conductive film 320. In an exemplary embodiment, the adhesive force of the anisotropic conductive film 320 may be about 100 gram-force per centimeter (gf/cm) to 1000 gf/cm, for example.

The anisotropic conductive film 320 may be disposed to be overlapped by the flexible circuit film 330. That is, the flexible circuit film 330 may have a sufficient width along the third direction dr3 to overlap the anisotropic conductive film 320. More specifically, the area occupied by the flexible circuit film 330 may be larger than the area occupied by the anisotropic conductive film 320.

In the exemplary embodiment, although it is illustrated that the conductive pads 310 and the flexible circuit film 330 are disposed on one side of the first substrate 110 and the second substrate 120 in a direction opposite to the second direction dr2 thereof, the invention is not limited thereto, and the conductive pads 310 and the flexible circuit film 330 may also be disposed on a plurality of sides of the first substrate 110 and the second substrate 120.

The flexible circuit film 330 extends to be bent toward the lower portion of the backlight unit 200, and a driving IC 340 may be disposed (e.g., mounted) in the lower portion of the backlight unit 200. Further, the flexible circuit film 330 may be connected with a printed circuit board 350. Various signals necessary for driving the pixel PX, which are input from the printed circuit board 350, are converted in a driving IC 340 through the flexible circuit film 330, and are then transmitted to the pixel PX via the conductive pad 310 through the flexible circuit film 330. In the exemplary embodiment, although it is shown that the flexible circuit film 330 is bent toward the lower portion of the backlight unit 200, the invention is not limited thereto, and the flexible circuit film 330 may have various shapes. In an exemplary embodiment, the flexible circuit film 330 may extend straight along a direction opposite to the third direction dr3, for example.

The protective film 410 is disposed on the lateral sides of the first substrate 110 and the second substrate 120 to overlap the plurality of flexible circuit films 330. The protective film 410 serves to protect the flexible circuit film 330 in the process of detaching and then reassembling the chassis member 510, which will be described later, when this chassis member 510 is attached at a wrong position. The protective film 410 may be disposed on the lateral sides of the first substrate 110 and the second substrate 120 along the first direction dr1, and may have a sufficient width to overlap the anisotropic conductive film 320 connecting the flexible circuit film 330 and the conductive pads 310, that is, a width extending along the third direction dr3 to such a degree of sufficiently overlapping the anisotropic conductive film 320.

In an exemplary embodiment, the length of the protective film 410 extending in the third direction dr3 is equal to or greater than the length of the anisotropic conductive film 320 extending in the third direction dr3, for example. Further, the length of the protective film 410 extending in the third direction dr3 is equal to or greater than the length from the lower side of the first substrate 110a to the upper side of the second substrate 120a.

In an exemplary embodiment, the protective film 410 may include at least one of polyethylene ether phthalate ("PET"), polyethylene naphthalate, polycarbonate, polyarylate, polyether imide, polyether sulfone, and polyimide, for example, but the invention is not limited thereto.

The protective film 410 may be attached to a flexible circuit board by a first adhesive layer 420. Here, the first adhesive layer 420 may be provided to attach the flexible circuit board and the protective film 410, and may be provided to have a sufficient thickness to fill a space between the protective film 410 and the first substrate 110 and a space between the protective film 410 and the second substrate 120 with respect to a part of an area on the lateral sides of the first substrate 110 and the second substrate 120, the area being not provided with the flexible circuit board and the conductive pads 310. Thus, the first adhesive layer 420 may effectively maintains adhesion among the flexible circuit film 330, the conductive pads 310, the first substrate 110, and the second substrate 120, and may effectively protects them from external shock or pressure.

The first adhesive layer 420 may be provided by applying an adhesive with a sufficient thickness and then curing the adhesive. Here, the "sufficient thickness" means a case where the first adhesive layer 420 has a thickness dt4 greater than the sum of the thickness dt1 of the flexible circuit film 330, the thickness dt2 of the conductive pad 310, and the thickness dt3 of the anisotropic conductive film 320. In this case, it is possible to effectively fill the step generated between the flexible circuit films 330.

In an exemplary embodiment, the adhesive force of the first adhesive layer 420 may be equal to or greater than 1500 gf/cm, for example, which may be higher than the adhesive force of a second adhesive layer 520 to be described later. However, the numerical value of the adhesive force of the first adhesive layer 420 is illustrative, and the specific numerical value thereof may vary depending on the optimization result in the product design stage. The flexible circuit film 330 may be effectively protected during the reassembly of the chassis member 510 by the adhesive force of the first adhesive layer 420, and details thereof will be described later.

In addition, the first adhesive layer 420 may have a property of blocking light. In an exemplary embodiment, the first adhesive layer 420 may be provided in black to block light, for example. A step may be disposed on the lateral sides of the first substrate 110 and the second substrate 120 due to the flexible circuit film 330, the anisotropic conductive film 320, and the conductive pad 310. There is a possibility that light is transmitted through the step to cause light leakage. However, when the first adhesive layer 420 has a property of blocking light, it may have an effect of blocking such light leakage.

The chassis member 510 may be provided to surround some of the lateral sides and lower sides of the first substrate 110, the second substrate 120, and the backlight unit 200 in order to prevent the first substrate 110, the second substrate 120, and the backlight unit 200 from being damaged from external impacts. In an exemplary embodiment, the chassis member 510 may include plastic, and may have sufficient strength to withstand external impacts. The chassis member 510 is in contact with the lateral sides of the first substrate 110 and the second substrate 120, more specifically, the outer side of the protective film 410 and the lower side of the backlight module, so as to allow the first substrate 110, the second substrate 120, and the backlight module to be fixed to each other.

In the exemplary embodiment, although it is shown that the chassis member 510 surrounds only one lateral side and a lower side of the first substrate 110, the second substrate 120, and the backlight unit 200, but the invention is not limited thereto. In an exemplary embodiment, the chassis member 510 may be provided to surround all of the lateral sides and lower sides of the first substrate 110, the second substrate 120, and the backlight unit 200, and may also be provided to surround only some of the lateral sides and lower sides thereof.

The chassis member 510 may be attached and fixed to the protective film 410 by the second adhesive layer 520. Unlike the first adhesive layer 420, the second adhesive layer 520 may be a double-sided tape having an adhesive force on both sides. When the second adhesive layer 520 is a double-sided tape, the curing process may not be performed unlike the formation by the application of an adhesive. Accordingly, when the second adhesive layer 520 includes a double-sided tape, the manufacturing time of the display device may be shortened. However, the invention is not limited thereto, and the second adhesive layer 520, like the first adhesive layer 420, may be provided by applying an adhesive with a sufficient thickness and then curing the adhesive.

In an exemplary embodiment, the adhesive force of the second adhesive layer 520 may be 1500 gf/cm or less, for example, which may be lower than the adhesive force of the above-described first adhesive layer 420. However, the numerical value of the adhesive force of the second adhesive layer 520 is exemplary, and the specific numerical value thereof may vary depending on the optimization result in the product design stage. However, even when the specific numerical value thereof varies, the adhesive force of the second adhesive layer 520 may be maintained to be lower than the adhesive force of the first adhesive layer 420.

When the adhesive force of the second adhesive layer 520 may be maintained to be lower than the adhesive force of the first adhesive layer 420, the display device, in which the attachment of the chassis member 510 is completed, is defective, so that the attachment and detachment of the chassis member 510 may be easily performed in the procedure of detaching and then reassembling the chassis member 510. That is, since the adhesive force of the first adhesive layer 420 fixing the chassis protective film 410 is stronger than the adhesive force of the second adhesive layer 520 fixing the chassis member 510, when detaching the chassis member 510 by applying a force, only the chassis member 510 may be detached without the protective film 410 being detached.

Details thereof will be described with reference to FIG. 5.

Figure 5:
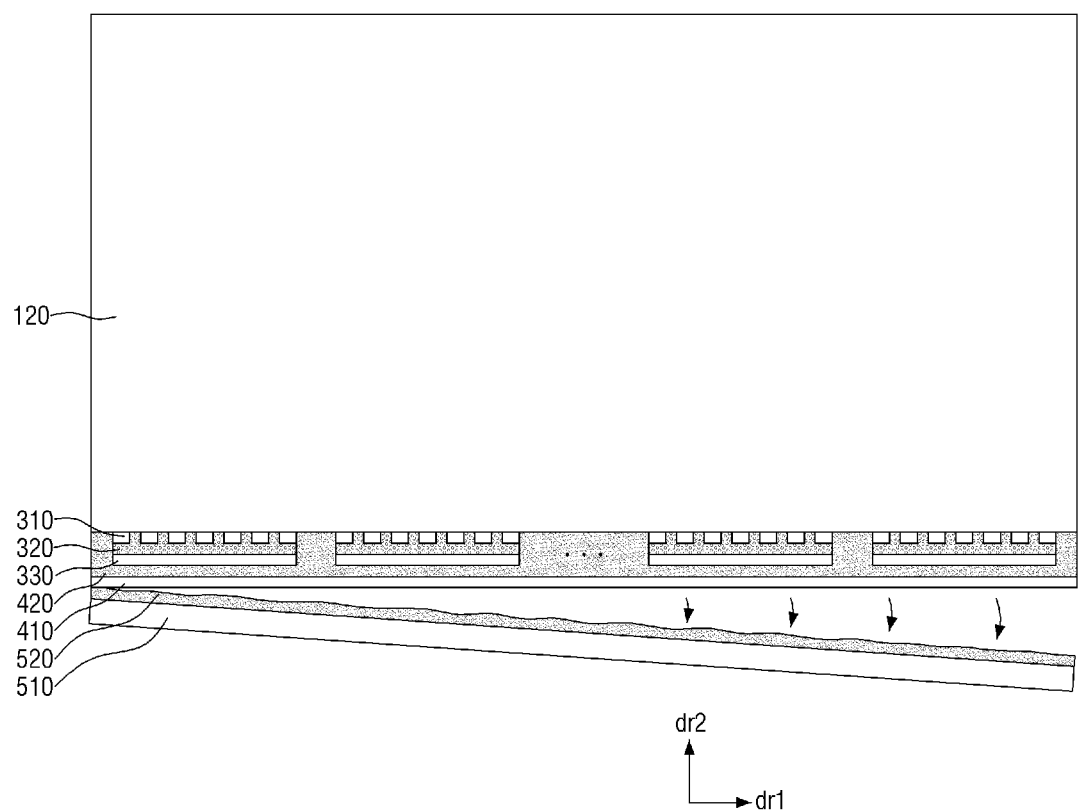
FIG. 5 is a plan view of an exemplary embodiment of a state where a chassis member is partially detached for reassembling the display device according to the invention shown in FIG. 4.

FIG. 5 is a plan view of a state where a chassis member is partially detached for reassembling the display device according to an exemplary embodiment of the invention shown in FIG. 4.

Referring to FIG. 5, when the chassis member 510 is detached by applying an external force in a direction opposite to the direction in which the second substrate 120 is disposed, that is, in a direction opposite to the second direction dr2, it may be ascertained that the protective film 410 is still fixed to the first substrate 110 by the first adhesive layer 420, whereas the chassis member 510 is detached from the protective film 410 along the line where the second adhesive layer 520 is disposed. As described above, this is a result of the adhesive force of the second adhesive layer 520 being weaker than the adhesive force of the first adhesive layer 420, and thus the detachment for reassembly of the chassis member 510 may be easily performed.

Figure 6:
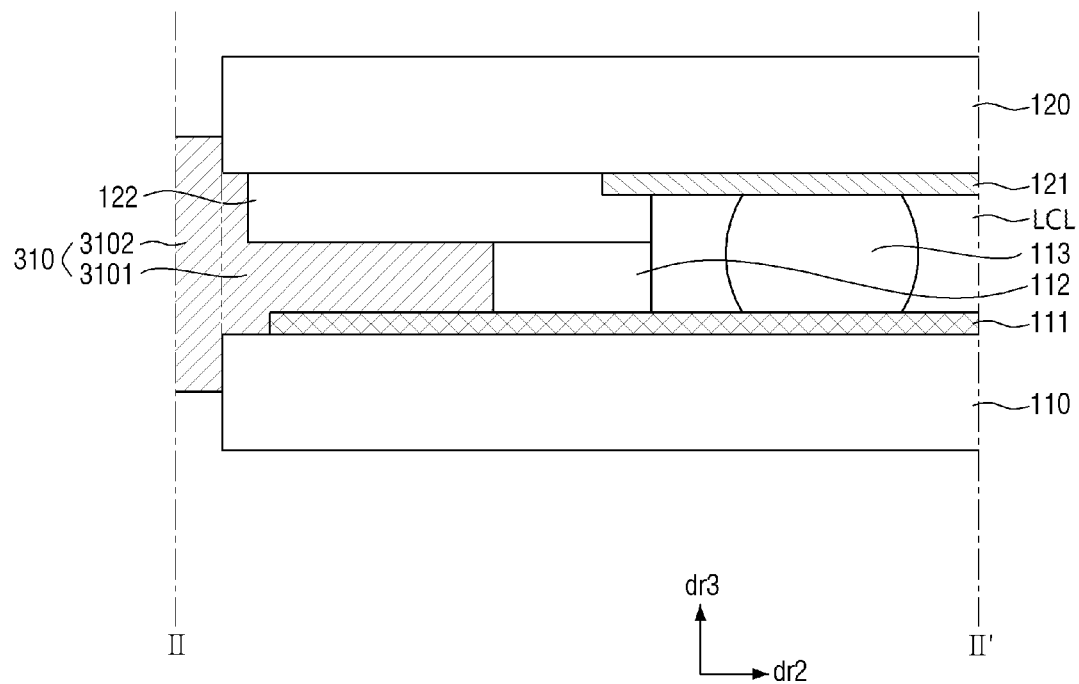
FIG. 6 is a sectional view taken along line II-II' of FIG. 2.

FIG. 6 is a sectional view taken along line II-II' of FIG. 2.

FIG. 6 shows how the conductive pads 310 disposed in a display device according to an exemplary embodiment of the invention are connected to components disposed between a first substrate 110 and a second substrate 120.

Referring to FIG. 6, the display device according to an exemplary embodiment of the invention includes a conductive line 111 disposed between a first substrate 110 and a second substrate 120, a connection insulating portion 112, a sealing member 113, an upper conductive layer 121, an insulating layer 122, and a conductive pad 310.

The conductive line 111 is electrically connected to the conductive pad 310 to transmit and receive various signals. The conductive line 111 may receive various signals necessary for driving each pixel PX and may provide these signals to the pixels PX (refer to FIGS. 1 and 2) disposed in the display area DA (refer to FIGS. 1 to 3). In an exemplary embodiment, the conductive line 111 may be a data line (not shown) carrying a data signal (not shown) including gradation information of each pixel PX and may be a gate line (not shown).

The conductive line 111 is not limited to the one disposed on the first substrate 110 as shown in the drawing, and an additional insulating material layer, a buffer layer, or the like may be disposed between the conductive line 111 and the first substrate 110.

The conductive line 111 has conductivity and includes a conductive material. In an exemplary embodiment, the conductive line 111 may include Ag, Mg, Al, Pt, Pd, Au, Ni, Nd, Ir, Cr, Li, Ca, LiF/Ca, LiF/Al, Mo, Ti, or a compound or combination thereof (for example, a combination of Ag and Mg). Examples of the conductive material may include a conductive polymer having conductivity, a transparent metal oxide, a graphene, a metal nonowire, and a combination thereof.

The conductive pad 310 includes a horizontal pad portion 3101 and a vertical pad portion 3102.

The horizontal pad portion 3101 may be physically in contact with the conductive line 111 to be electrically connected with the conductive line 111, and may be disposed to overlap the first substrate 110 and the second substrate 120. The horizontal pad portion 3101 may be insulated from the upper conductive layer 121 by the insulating layer 122 disposed thereon. Further, although not shown in the drawing, the horizontal pad portions 3101 may be insulated from each other by the connection insulating portion 112 disposed so as to be in contact with the space between the plurality of horizontal pad portions 3101 and the inside (that is, the direction in which the sealing member 113 is disposed) of the horizontal pad portion. The vertical pad portion 3102 may be physically in contact with the horizontal pad portion 3101 to be electrically connected to the horizontal pad portion 3101, and may be disposed on the outer lateral sides of the first substrate 110 and the second substrate 120. That is, the vertical pad portion 3102 may be disposed not to overlap the first substrate 110 and the second substrate 120, and may be provided to protrude toward the lateral direction of the first substrate 110 and the second substrate 120. The vertical pad portion 3102 may be electrically connected with the flexible circuit film 330 (refer to FIGS. 1 to 5) through the above-described anisotropic conductive film 320 (refer to FIGS. 2 to 5).

The conductive pad 310 including the horizontal pad portion 3101 and the vertical pad portion 3102 has conductivity and includes a conductive material. Examples of the conductive material may include Ag, Mg, Al, Pt, Pd, Au, Ni, Nd, Ir, Cr, Li, Ca, LiF/Ca, LiF/Al, Mo, Ti, and a compound or combination thereof (for example, a combination of Ag and Mg). Further, examples of the conductive material may include a conductive polymer having conductivity, a transparent metal oxide, a graphene, a metal nonowire, and a combination thereof.

The conductive pad 310, unlike the conductive line 111, may be provided such that the horizontal pad portion 3101 and the vertical pad portion 3102 are separated from each other. Specifically, the vertical pad portion 3102 may be provided by printing the conductive material in a state where the horizontal pad portion 3101 is first disposed between the first substrate 110 and the second substrate 120. The horizontal pad portion 3101 and the vertical pad portion 3102 may include different conductive materials from each other. However, the invention is not limited thereto, and the horizontal pad portion 3101 and the vertical pad portion 3102 may be unitary with each other, and may also include the same conductive material.

The connection insulating portion 112, as described above, may be provided to surround the plurality of horizontal pads 3101 and the inner side of the horizontal pads 3101, so as to insulate the horizontal pads 3101 from each other. The connection insulating portion 112 may include an insulating material. Further, the connection insulating portion 112 may fill the space between the horizontal pad portions 3101, so as to prevent foreign substances from permeating between the first substrate 110 and second substrate 120 of the display device. However, in other exemplary embodiments, the horizontal pad portion 3101 may be omitted.

The sealing member 113 may be disposed along the edges of the first substrate 110 and the second substrate 120. The sealing member 113 may couple the first substrate 110 and the second substrate 120 together. That is, the sealing member 113 may have adhesiveness. Further, a liquid crystal layer LCL may be interposed in a space between the first substrate 110 and second substrate 120 surrounded by the sealing member 113, and the sealing member 113 may prevent the components constituting the liquid crystal layer LCL from leaking to the outside.

The upper conductive layer 121 is disposed on the lower side of the second substrate 120. In an exemplary embodiment, the upper conductive layer 121 may be a common electrode disposed on the entire lower side of the second substrate 120. In an exemplary embodiment, the upper conductive layer 121, which is an optically thin layer, may include Li, Ca, LiF/Ca, LiF/Al, Al, Mg, BaF, Ba, Ag, or a compound or combination thereof (for example, a combination of Ag and Mg), or may include a transparent metal oxide, such as indium tin oxide ("ITO"), indium zinc oxide ("IZO"), zinc oxide (ZnO), indium tin zinc oxide ("ITZO"), Mo, Ti, or the like.

A part of the upper conductive layer 121 may be disposed between the insulating layer 122 and the second substrate 120. Further, a part of the upper conductive layer 121 may face the horizontal pad portion 3101 with the insulating layer 122 interposed therebetween. That is, a part of the insulating layer 122 may be interposed between the horizontal pad portion 3101 and the upper conductive layer 121, and may insulate the horizontal pad portion 3101 and the upper conductive layer 121 from each other. The insulating layer 122 may include one layer or a plurality of layers of an organic film and/or an inorganic film. However, in other exemplary embodiments, when the horizontal pad portion 3101 and the upper conductive layer 121 are spaced apart by a sufficient distance to be insulated from each other, the insulating layer 122 may be omitted.

Figure 7:
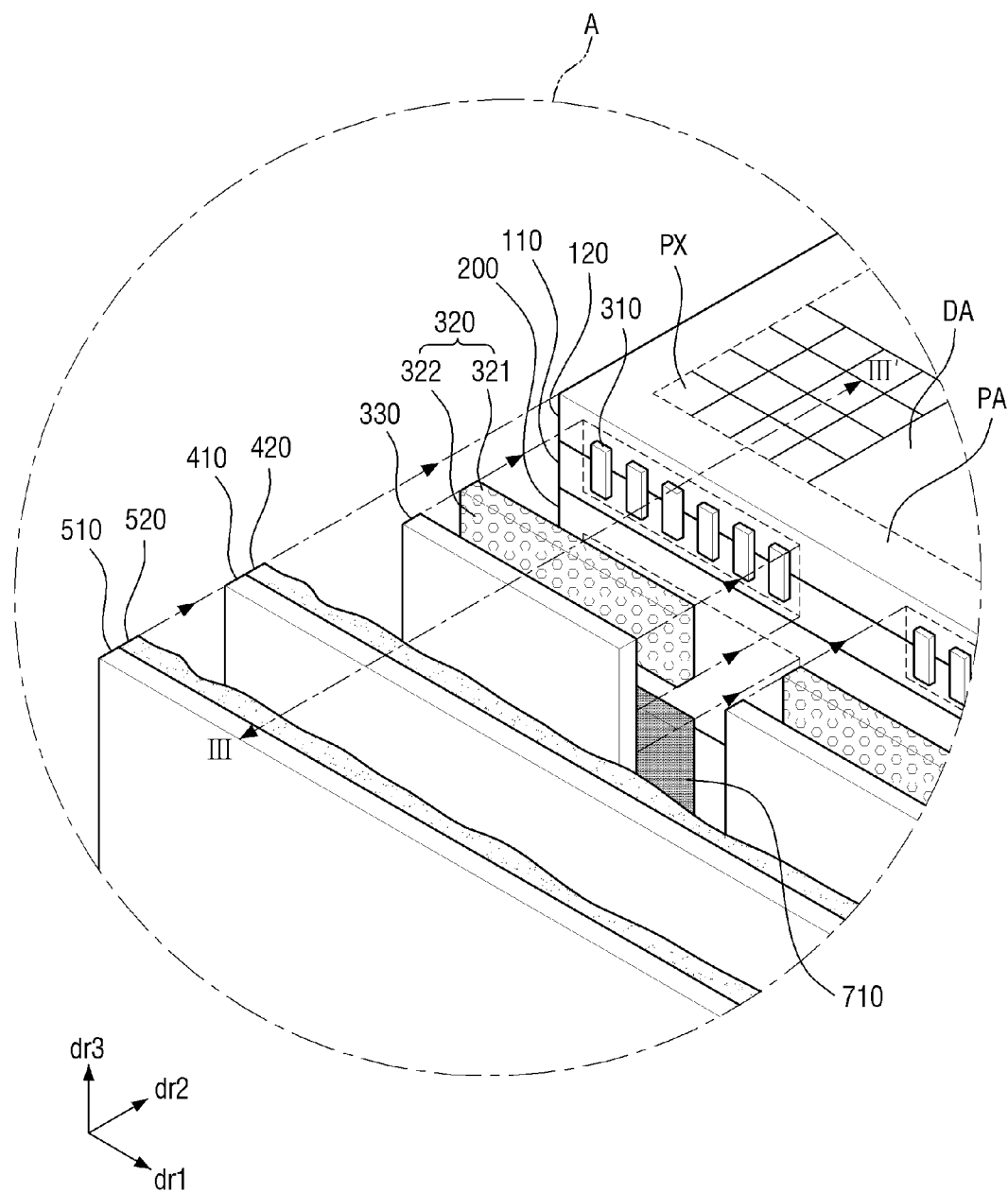
FIG. 7 is a perspective view of another exemplary embodiment of an area of a display device according to the invention, the area corresponding to the area A of FIG. 1.
Figure 8:
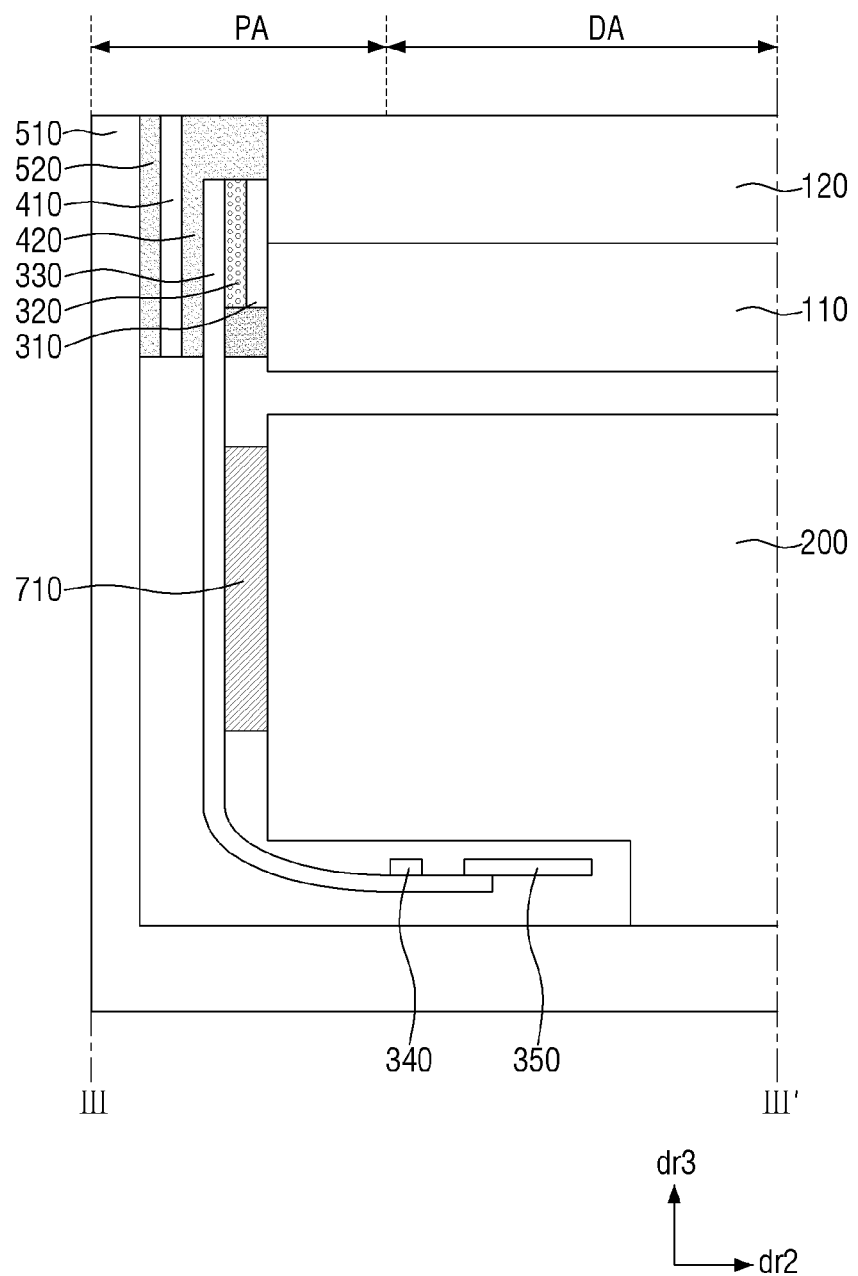
FIG. 8 is a sectional view taken along line III-III' of FIG. 7.

FIG. 7 is a perspective view of an area of a display device according to another exemplary embodiment of the invention, the area corresponding to the area A of FIG. 1. FIG. 8 is a sectional view taken along line III-III' of FIG. 7.

The display device according to t the exemplary embodiment has a difference of further including a third adhesive layer 710 as compared with the display device according to the exemplary embodiment shown in FIGS. 1 to 4. Therefore, in the exemplary embodiment, the third adhesive layer 710 will be mainly described, and descriptions of other components will be omitted or simplified. The reference numerals shown in FIGS. 1 to 4 will be applied to reference numerals which are not explained in the exemplary embodiment.

Referring to FIGS. 7 and 8, the display device according to the exemplary embodiment includes a first substrate 110, a second substrate 120, a backlight unit 200, a conductive pad 310, a flexible circuit film 330, a protective film 410, and a chassis member 510.

The flexible circuit film 330 may be connected to the conductive pad 310 through the anisotropic conductive film 320, but unlike the display device according to the exemplary embodiment shown in FIGS. 1 to 4, may be attached and fixed to the backlight unit 200 by the third adhesive layer 710.

Here, the third adhesive layer 710 may be a double-sided tape having an adhesive force on both sides. When the third adhesive layer 710 is a double-sided tape, the third adhesive layer 710 is the same as the above-described second adhesive layer in that the manufacturing time may be shortened because the curing process is not performed, unlike the formation by application of an adhesive. However, the invention is not limited thereto, and the third adhesive layer 710 may also be provided by applying an adhesive with a sufficient thickness and then curing the adhesive.

When the flexible circuit film 330 and the backlight unit 200 are fixed by the third adhesive layer 710, the overall durability of the display device may be increased. Specifically, since the first substrate 110, the second substrate 120, and the backlight unit 200 are fixed not only by a chassis but also by the flexible circuit film 330, durability may be further increased.

Figure 9:
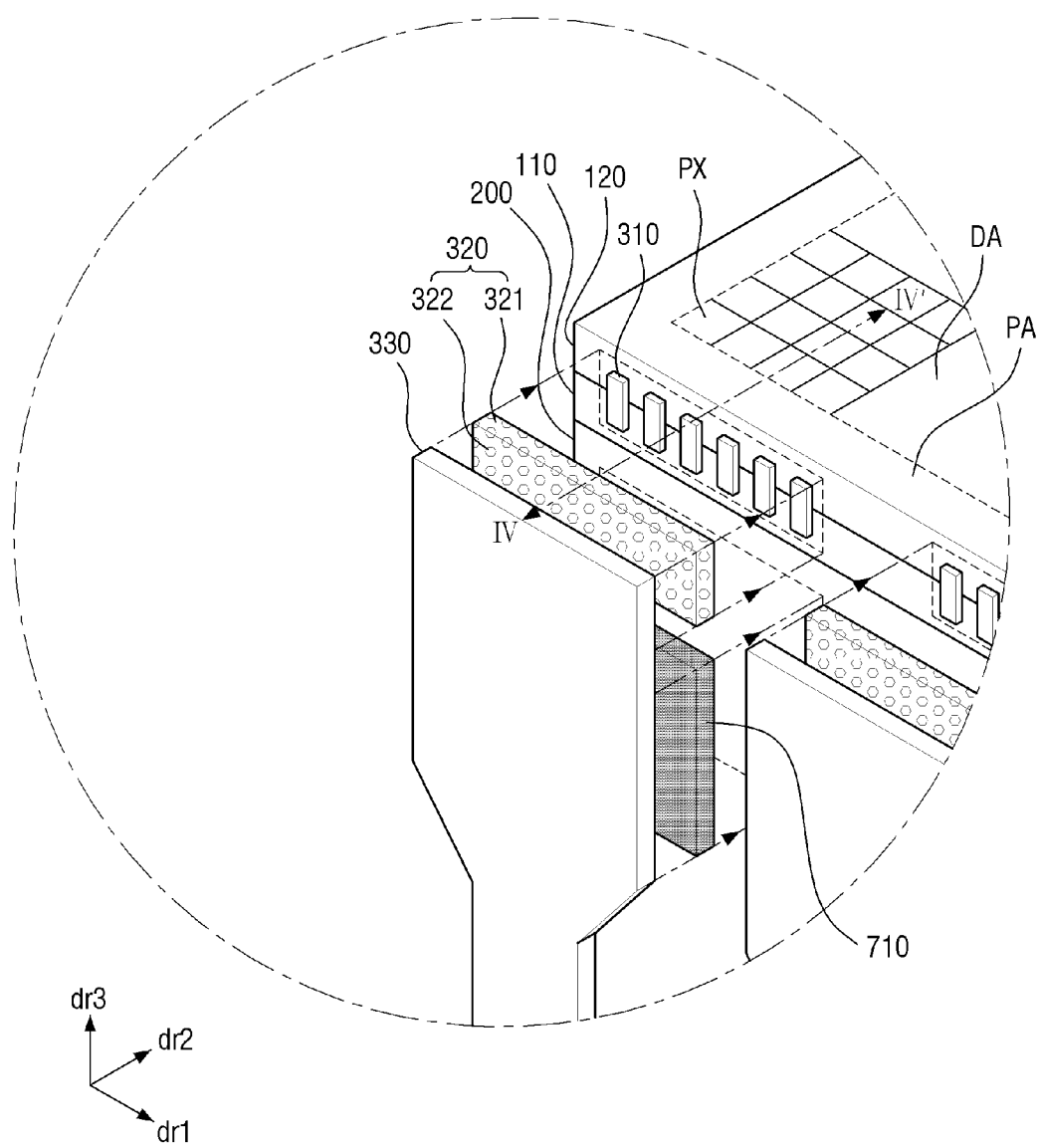
FIG. 9 is a perspective view of another exemplary embodiment of an area of a display device according to the invention, the area corresponding to the area A of FIG. 1.
Figure 10:
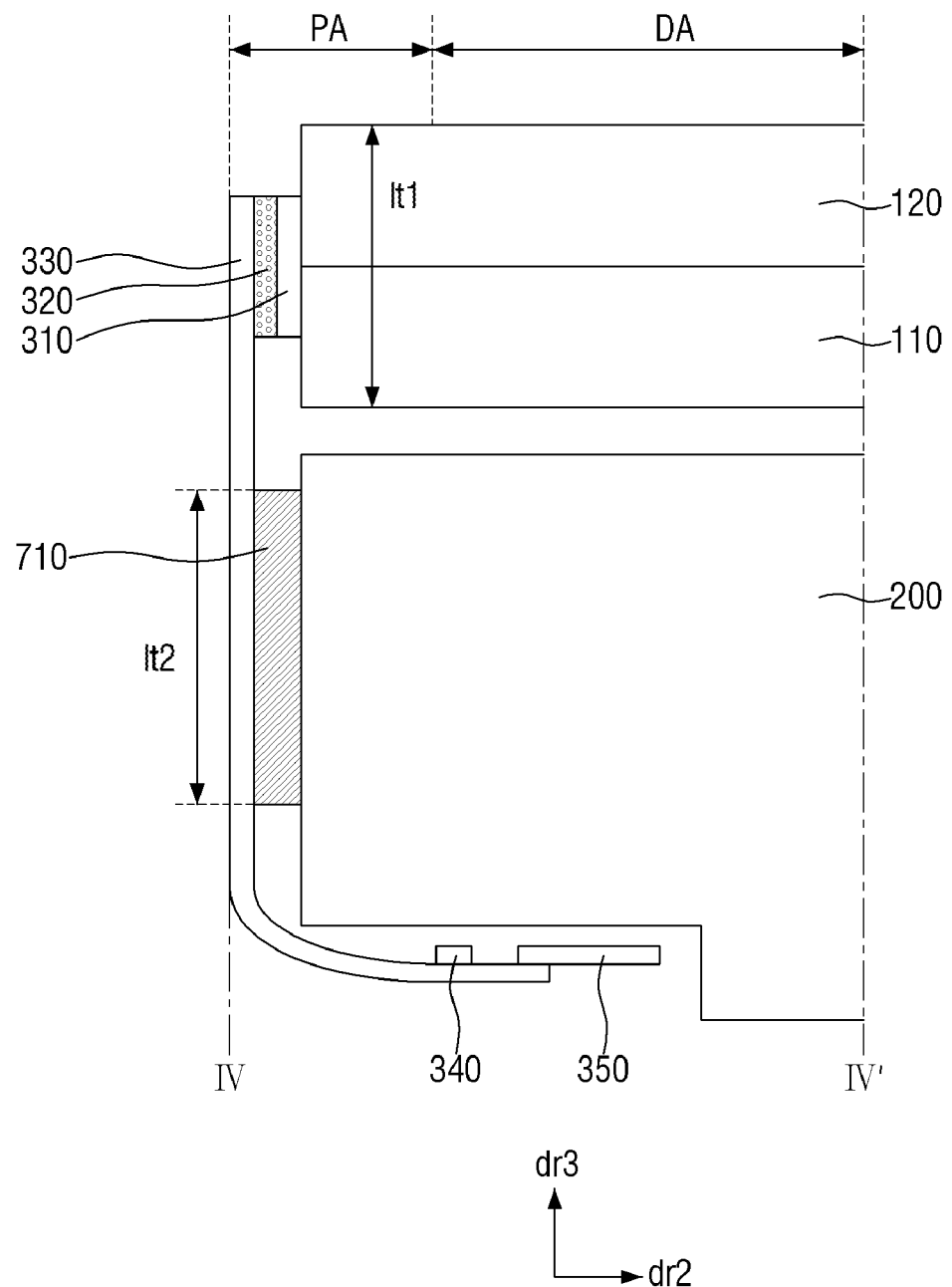
FIG. 10 is a sectional view taken along line IV-IV' of FIG. 9.
Figure 11:
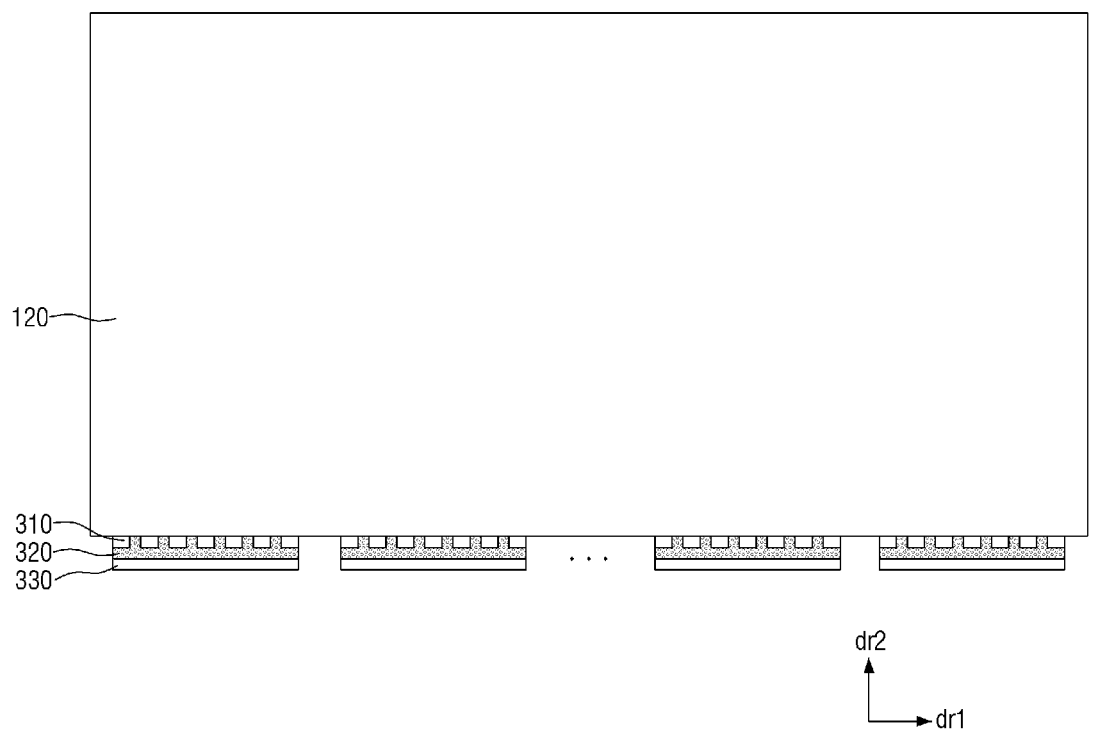
FIG. 11 is a plan view of the display device shown in FIG. 9 as viewed from above a second substrate.

FIG. 9 is a perspective view of an area of a display device according to another exemplary embodiment of the invention, the area corresponding to the area A of FIG. 1, FIG. 10 is a sectional view taken along line IV-IV' of FIG. 9, and FIG. 11 is a plan view of the display device shown in FIG. 9 as viewed from above a second substrate.

The display device according to the exemplary embodiment is different from the display device according to the exemplary embodiment shown in FIGS. 1 to 4 in that this display device further includes a third adhesive layer, whereas does not include a first adhesive layer 420, a second adhesive layer 520, a protective film 40, and a chassis member 510. Therefore, in the exemplary embodiment, the first adhesive layer 420, the second adhesive layer 520, the third adhesive layer 710, the protective film 40, and the chassis member 510 will be mainly described, and descriptions of other components will be omitted or simplified. The reference numerals shown in FIGS. 1 to 4 will be applied to reference numerals which are not explained in the exemplary embodiment.

Referring to FIGS. 9 to 11, the display device according to the exemplary embodiment includes a first substrate 110, a second substrate 120, a backlight unit 200, a conductive pad 310, and a flexible circuit film 330.

The flexible circuit film 330 may be connected to the conductive pad 310 through the anisotropic conductive film 320, but unlike the display device according to the exemplary embodiment shown in FIGS. 1 to 4, may be attached and fixed to the backlight unit 200 by the third adhesive layer 710. Here, since it has been described in the above-described embodiment with reference to FIGS. 7 and 8 that the third adhesive layer 710 may be a double-sided tape having an adhesive force on both sides, a description thereof will be omitted.

In the display device according to the exemplary embodiment, the fixation of the first substrate 110, the second substrate 120 and the backlight unit 200 is performed by the flexible circuit film 330. Specifically, the first substrate and the second substrate are attached to the flexible circuit film 330 through the anisotropic conductive film 320, and the backlight unit 200 is attached to the flexible circuit film 330 through a third adhesive layer.

Specifically, since the conductive pad 310 protrudes toward the lateral sides of the first substrate 110 and the second substrate 120, the flexible circuit film 330 may be flatly disposed along the lateral side of the backlight unit 200 without being bent in a region where the first substrate 110, the second substrate 120, and the backlight unit 200 are adjacent to each other. Thus, the flexible circuit film 330 may be firmly attached to the first substrate 110, the second substrate 120, and the backlight unit 200. Further, although the display device according to the exemplary embodiment has a thin bezel including only the minimum non-display area PA, unlike the non-display area PA extending in the first direction dr1 or the second direction dr2, the third adhesive may extend along the third direction dr3 to secure a sufficient adhesion area on the lateral side of the backlight unit 200 to such a degree that the flexible circuit film 330 and the backlight unit 200 are firmly fixed.

In particular, the length lt1 measured along the third direction dr3 of the region where the third adhesive layer 710 adheres to the lateral side of the backlight unit 200 is greater than the length lt2 of the sum of the thickness of the first substrate 110 and the thickness of the second substrate 120, this adhesion area maybe an adhesion area sufficient to firmly fix the flexible circuit film 330 and the backlight unit 200.

Thus, the first substrate 110, the second substrate 120, and the backlight unit 200 may be effectively fixed only by the flexible circuit film 330 by the addition of the third adhesive layer 710. Therefore, since the non-display area PA is provided to have a thickness corresponding to the first adhesive layer 420, the protective film 410, the second adhesive layer 520, and the chassis member 510 according to the exemplary embodiment shown in FIGS. 1 to 4, it is possible to realize a display device having a thinner bezel.

Although not shown in the drawing, in other exemplary embodiments, a colored protective tape may adhere to the outer side of the flexible circuit film 330 in order to prevent the flexible circuit film 330 from being exposed to the outside or contaminated by external foreign substances. In an exemplary embodiment, a black tape having a thickness smaller than the thickness of the flexible circuit film 330 may adhere to surround the lateral sides of the first substrate 110, the second substrate 120, and the backlight unit 200.

Figure 12:
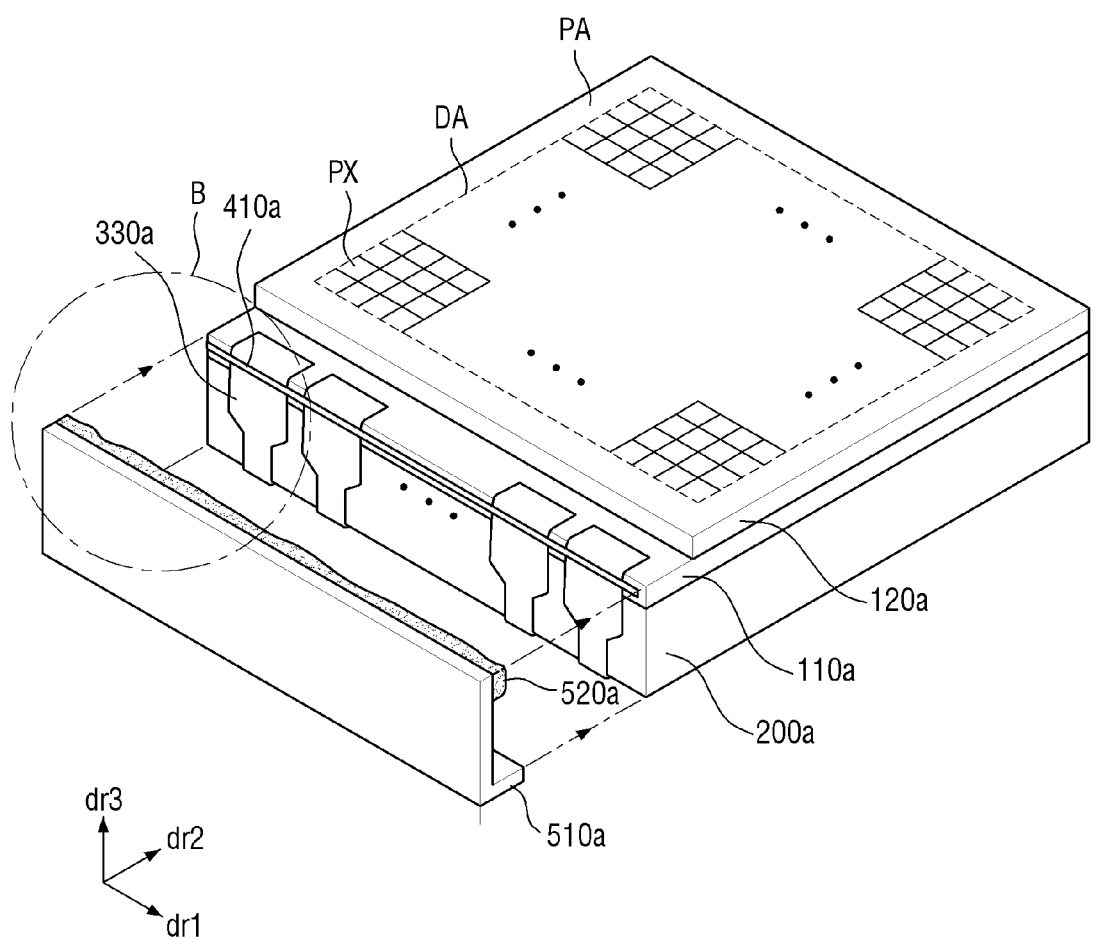
FIG. 12 is a perspective view of another exemplary embodiment of a display device according to the invention.
Figure 13:
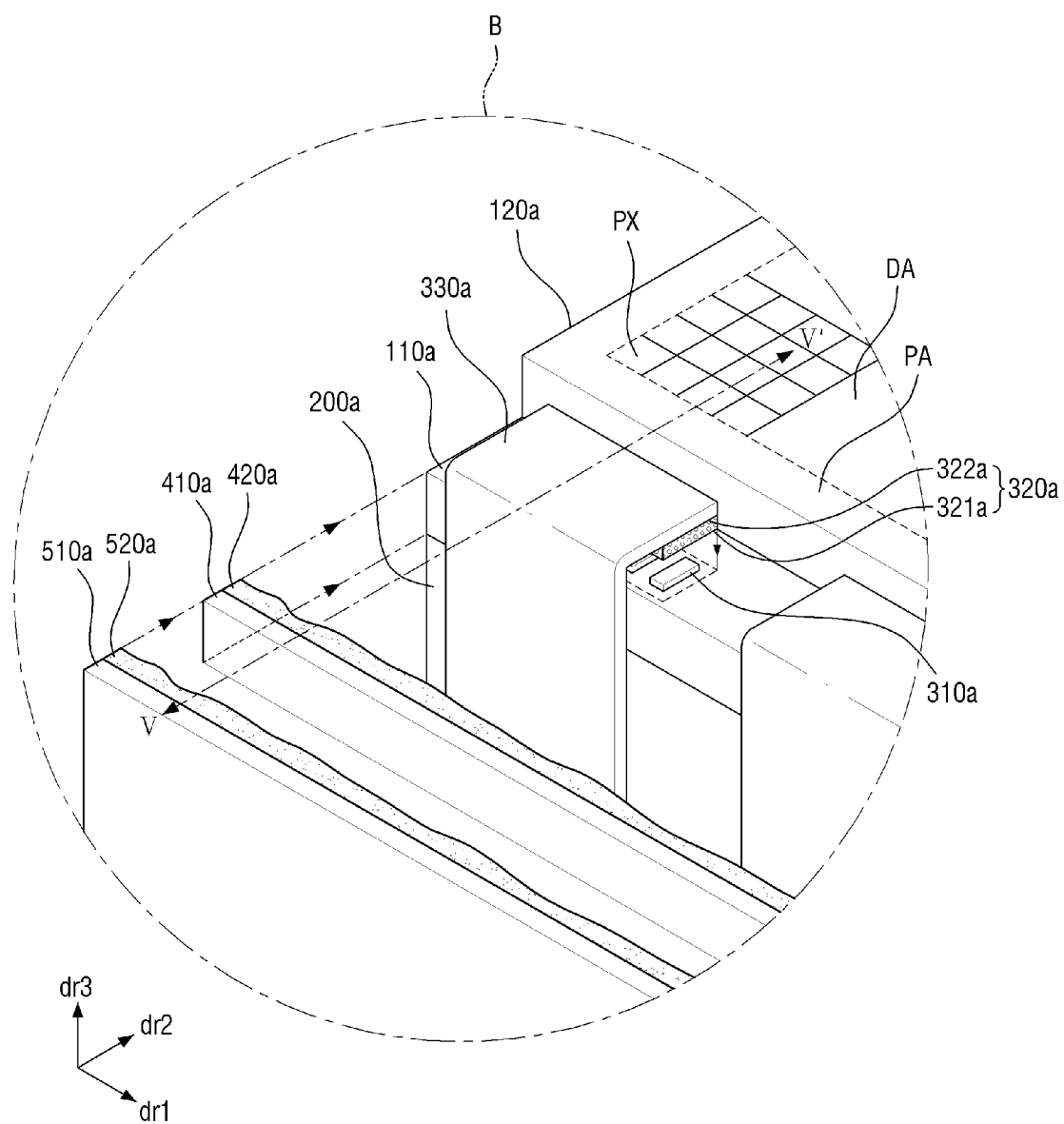
FIG. 13 is an enlarged perspective view of the area B of FIG. 12.
Figure 14:
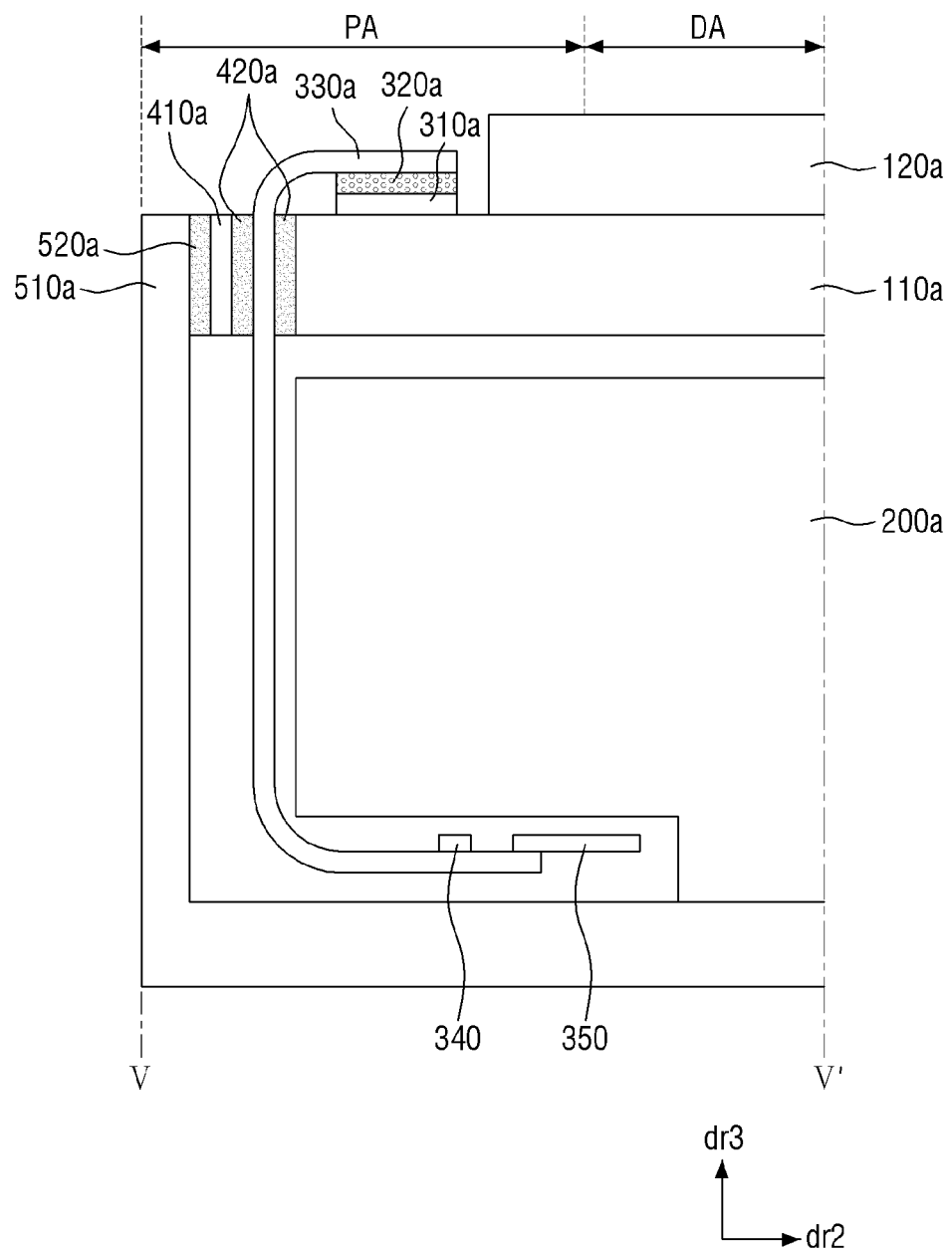
FIG. 14 is a sectional view taken along line V-V' of FIG. 13.
Figure 15:
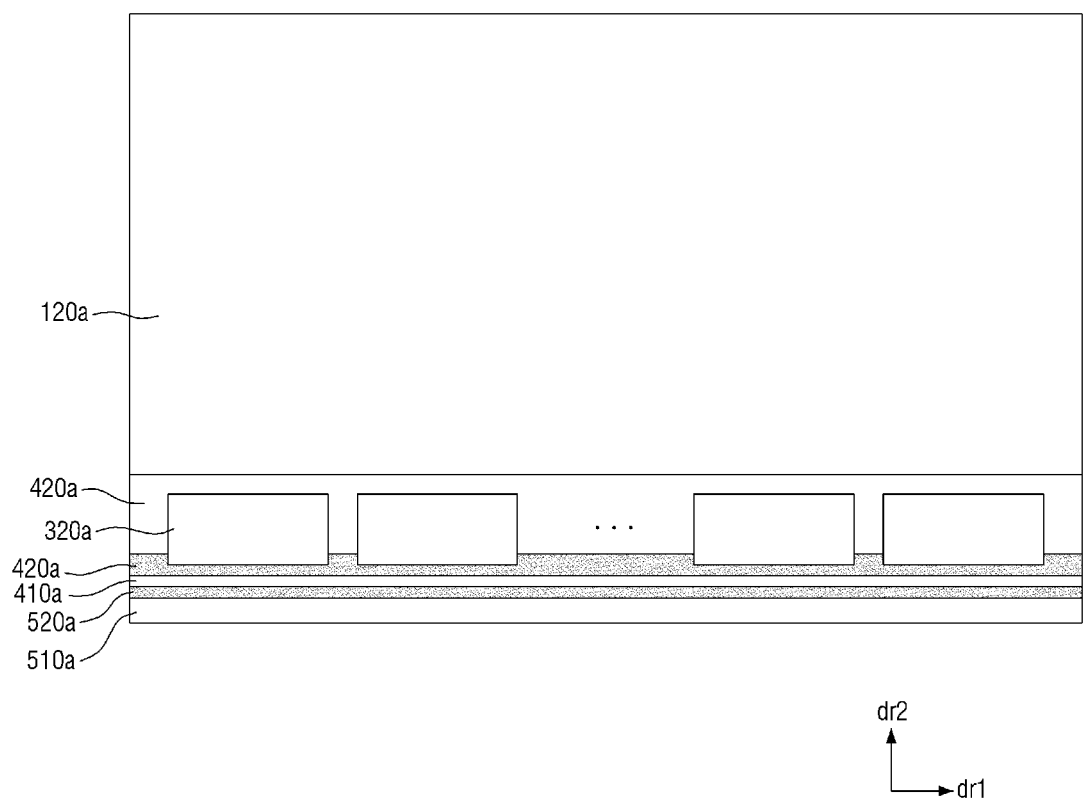
FIG. 15 is a plan view of the display device shown in FIG. 12 as viewed from above a second substrate.

FIG. 12 is a perspective view of a display device according to another exemplary embodiment of the invention, FIG. 13 is an enlarged perspective view of the area B of FIG. 12, FIG. 14 is a sectional view taken along line V-V' of FIG. 13, and FIG. 15 is a plan view of the display device shown in FIG. 12 as viewed from above a second substrate.

The display device according to the exemplary embodiment is different from the display device according to the exemplary embodiment shown in FIGS. 1 to 4 in that a part of the lateral side of the first substrate 110 is exposed upward without being overlapped by the second substrate 120. Accordingly, in the exemplary embodiment, a structure according to the difference in size between the first substrate 110 and the second substrate 120 will be mainly described, and a description of other components will be omitted or simplified.

Referring to FIGS. 12 to 15, the display device according to the exemplary embodiment includes a first substrate 110a, a second substrate 120a, a backlight unit 200a, a conductive pad 310a, a flexible circuit film 330a, a protective film 410a, and a chassis member 510a.

According to the exemplary embodiment, the first substrate 110a may not be completely overlapped by the second substrate 120a, and a part of the lateral side thereof may be exposed toward the third direction dr3. In a lateral region of the first substrate 110a which is not overlapped by the second substrate 120a, the conductive pad 310a may be disposed to protrude toward the third direction dr3. The backlight unit 200a may be disposed beneath the first substrate 110a. Other descriptions of the first substrate 110a, the second substrate 120a, and the backlight unit 200a may be equally applied to those of the first substrate 110 (refer to FIGS. 1 to 4), the second substrate 120 (refer to FIGS. 1 to 4), and the backlight unit 200 (refer to FIGS. 1 to 4).

The conductive pad 310a may be electrically connected with the flexible circuit film 330a through the anisotropic conductive film 320a. The anisotropic conductive film 320 may include a polymer 321a and conductive particles 322a included in the polymer 321. Since the conductive pad 310a is disposed so as to protrude toward the upper side of the first substrate 110a, that is, toward the third direction dr3, unlike the exemplary embodiment shown in FIGS. 1 to 4, the flexible circuit film 330a may be disposed to be bent approximately to a right angle. A first adhesive 420a may be additionally applied between the lateral side of the first substrate 110a and the flexible circuit film 330a. Other descriptions of the conductive pad 310a, the anisotropic conductive film 320a, and the flexible circuit film 330a may be equally applied to those of the conductive pad 310 (refer to FIGS. 1 to 4), the anisotropic conductive film 320 (refer to FIGS. 1 to 4), and the flexible circuit film 330 (refer to FIGS. 1 to 4).

The protective film 410a is disposed on the lateral side of the first substrate 110a in a direction toward the outer lateral side of the first substrate 110a, that is, in a direction opposite to the second direction dr2 of the first substrate 110a. That is, the protective film 410a is disposed on the flexible circuit film 330a in a direction toward the outer lateral side of the first substrate 110a. The protective film 410a may be fixed on the flexible circuit film 330a by the first adhesive 420a, and the first adhesive 420a may overlap the flexible circuit film 330a on the lateral side of the first substrate 110a and may be applied to fill the space between the flexible circuit films 330a. Other descriptions of the protective film 410a and the first adhesive 420a may be equally applied to those of the protective film 410 (refer to FIGS. 1 to 4) and the first adhesive layer 420 (refer to FIGS. 1 to 4).

The chassis member 510a is disposed on the protective film 410a, and is fixed by a second adhesive layer 520a. Other descriptions of the chassis member 510a and the second adhesive layer 520a may be equally applied to those of the chassis member 510 (refer to FIGS. 1 to 4) and the second adhesive layer 520 (refer to FIGS. 1 to 4).

Figure 16:
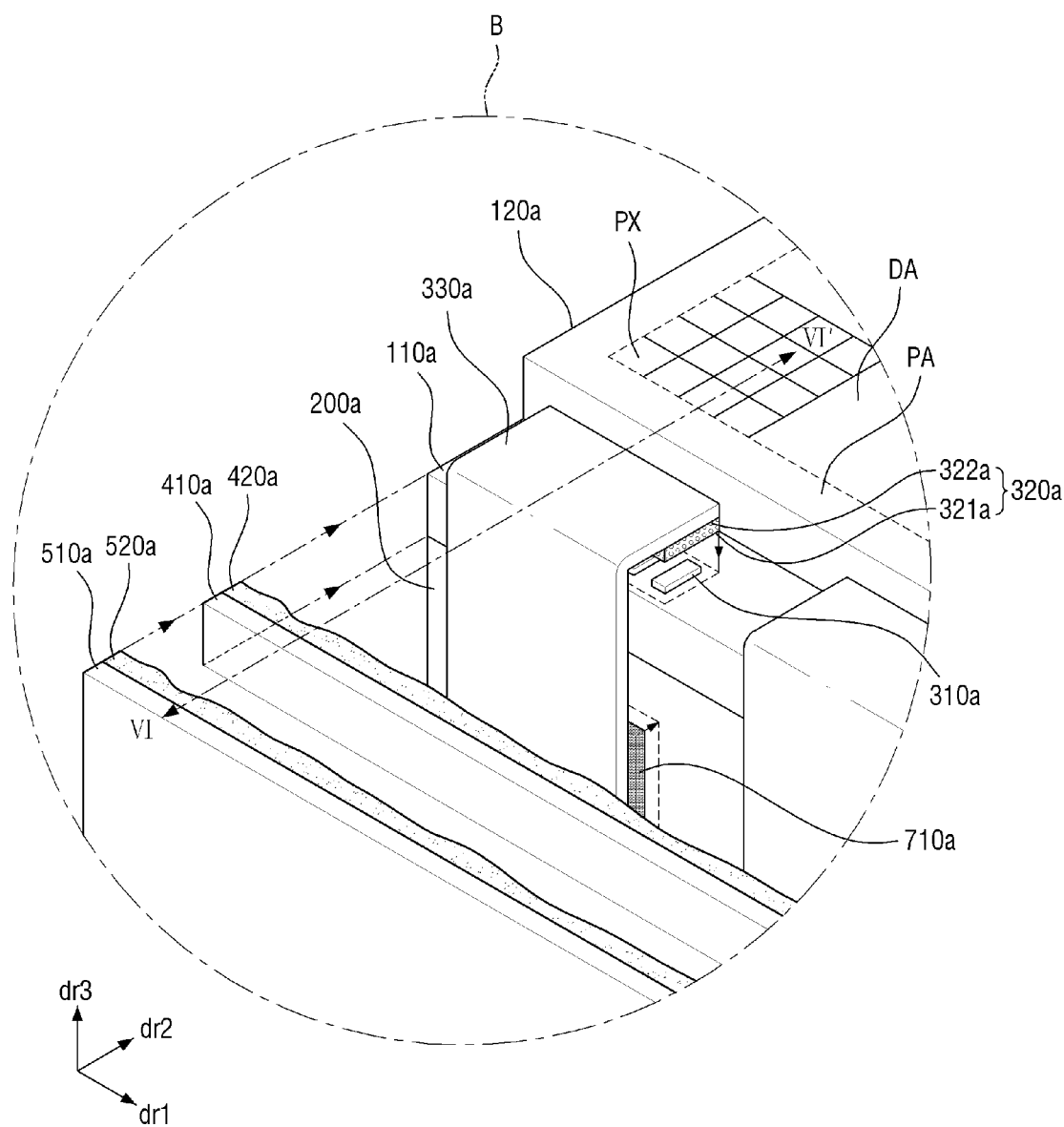
FIG. 16 is a perspective view of another exemplary embodiment of an area of a display device according to the invention, the area corresponding to the area B of FIG. 12.

That is, according to the exemplary embodiment, even when the first substrate 110a is not completely overlapped by the second substrate 120a and the flexible circuit film 330a is bent, the same effect as the exemplary embodiment shown in FIGS. 1 to 4 may be obtained. FIG. 16 is a perspective view of an area of a display device according to another exemplary embodiment of the invention, the area corresponding to the area B of FIG. 12, and FIG. 17 is a sectional view taken along line VI-VI' of FIG. 16.

The display device according to the exemplary embodiment is different from the display device according to the exemplary embodiment shown in FIGS. 12 to 15 in that it further includes the third adhesive layer 710a. Accordingly, in the exemplary embodiment, the third adhesive layer 710a will be mainly described, and a description of other components will be omitted or simplified. The reference numerals shown in FIGS. 12 to 15 will be applied to reference numerals which are not explained in the exemplary embodiment.

Figure 17:
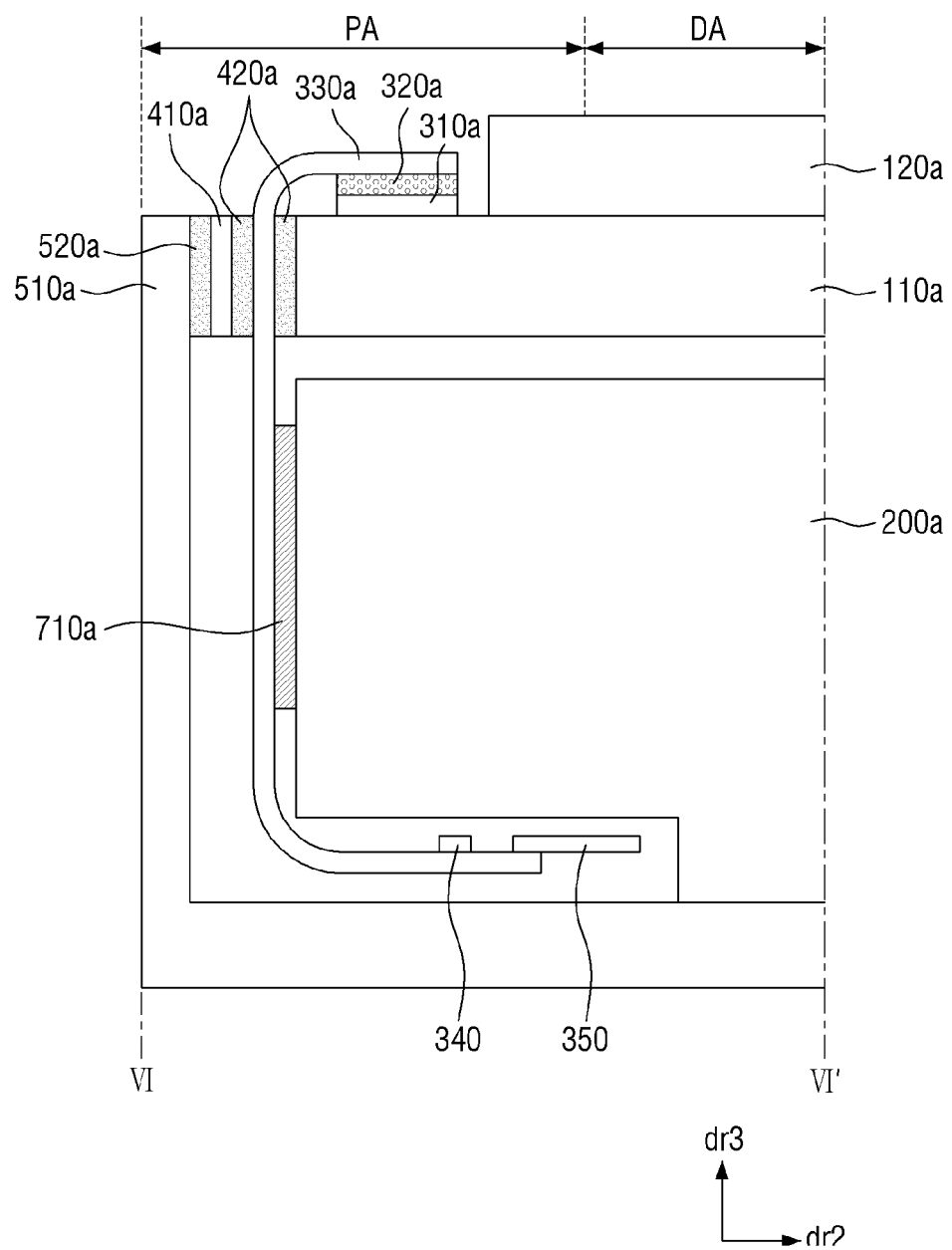
FIG. 17 is a sectional view taken along line VI-VI' of FIG. 16.

Referring to FIGS. 16 and 17, the display device according to the exemplary embodiment includes a first substrate 110a, a second substrate 120a, a backlight unit 200a, a conductive pad 310a, a flexible circuit film 330a, a protective film 410a, and a chassis member 510a.

The flexible circuit film 330a may be connected with the conductive pad 310a through the anisotropic conductive film 320a, but unlike the display device according to the exemplary embodiment shown in FIGS. 12 to 15, may be attached and fixed to the backlight unit 200a by the third adhesive layer 710a.

A detailed description of the third adhesive layer 710a may be equally applied to the description of the third adhesive layer 710 (refer to FIGS. 7 and 8) according to the exemplary embodiment shown in FIGS. 7 and 8, and effects of the third adhesive layer 710a may be equally applied to those of the third adhesive layer 710 (refer to FIGS. 7 and 8). Thus, the detailed description of the third adhesive layer 710a will be omitted.

Figure 18:
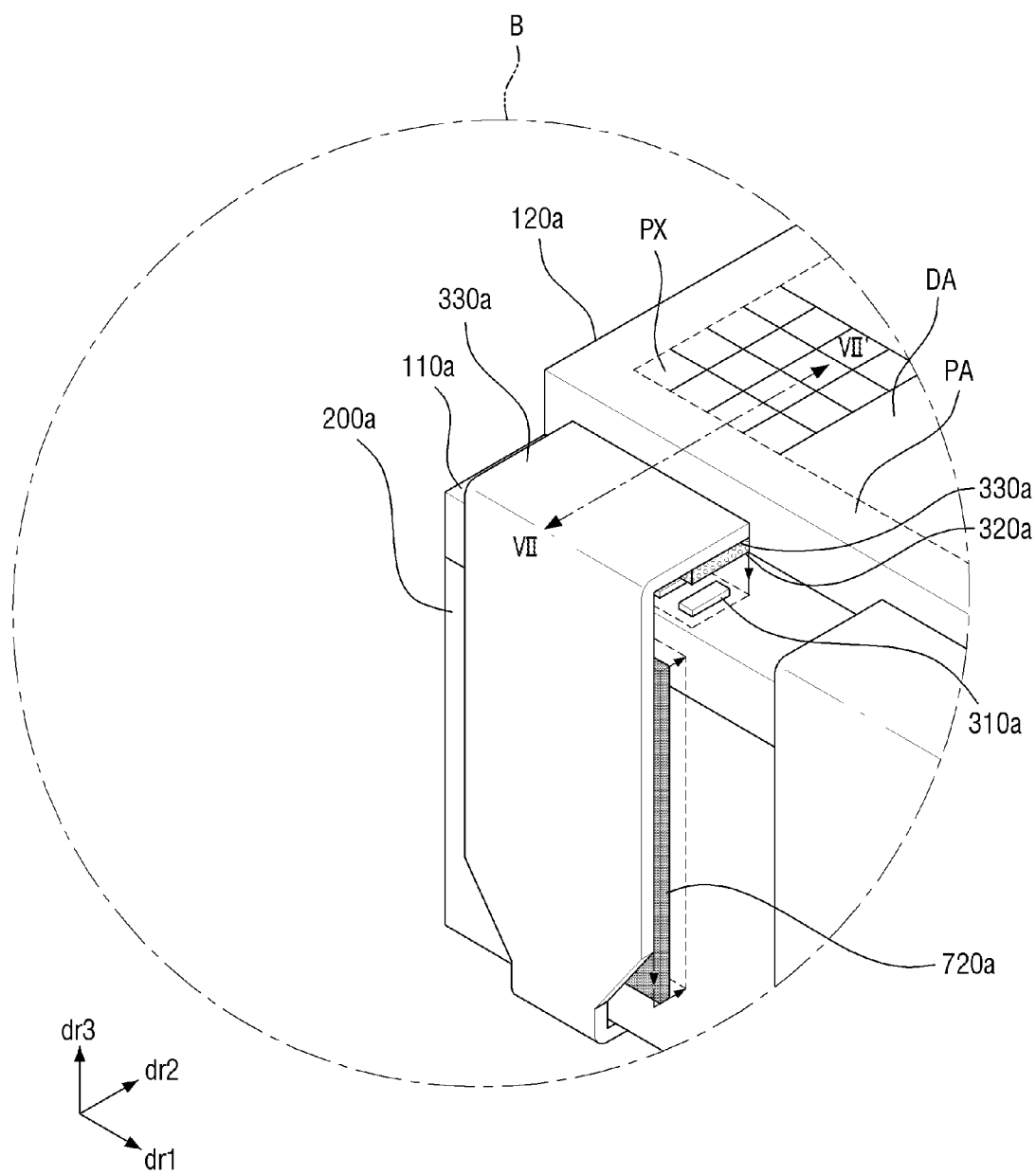
FIG. 18 is a perspective view of another exemplary embodiment of an area of a display device according to the invention, the area corresponding to the area B of FIG. 12.
Figure 19:
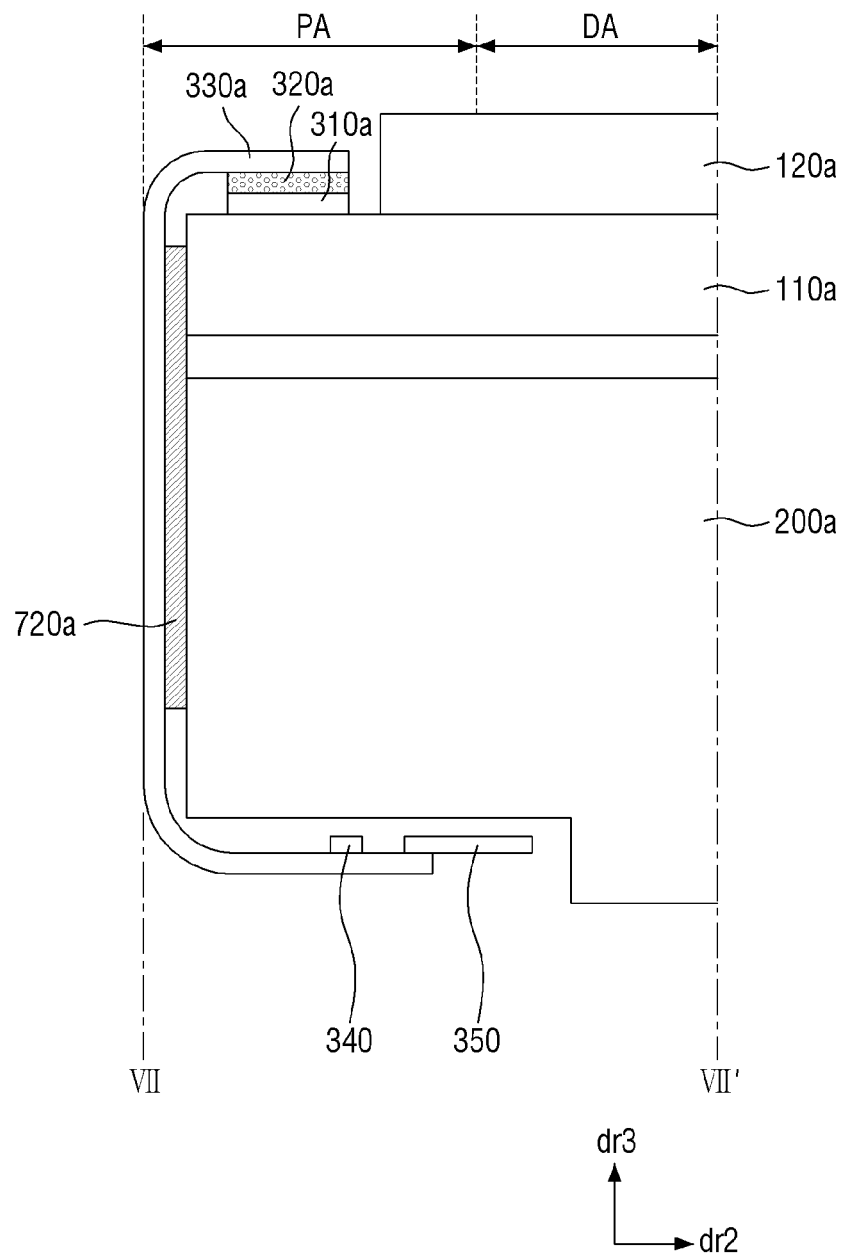
FIG. 19 is a sectional view taken along line VII-VII' of FIG. 18.
Figure 20:
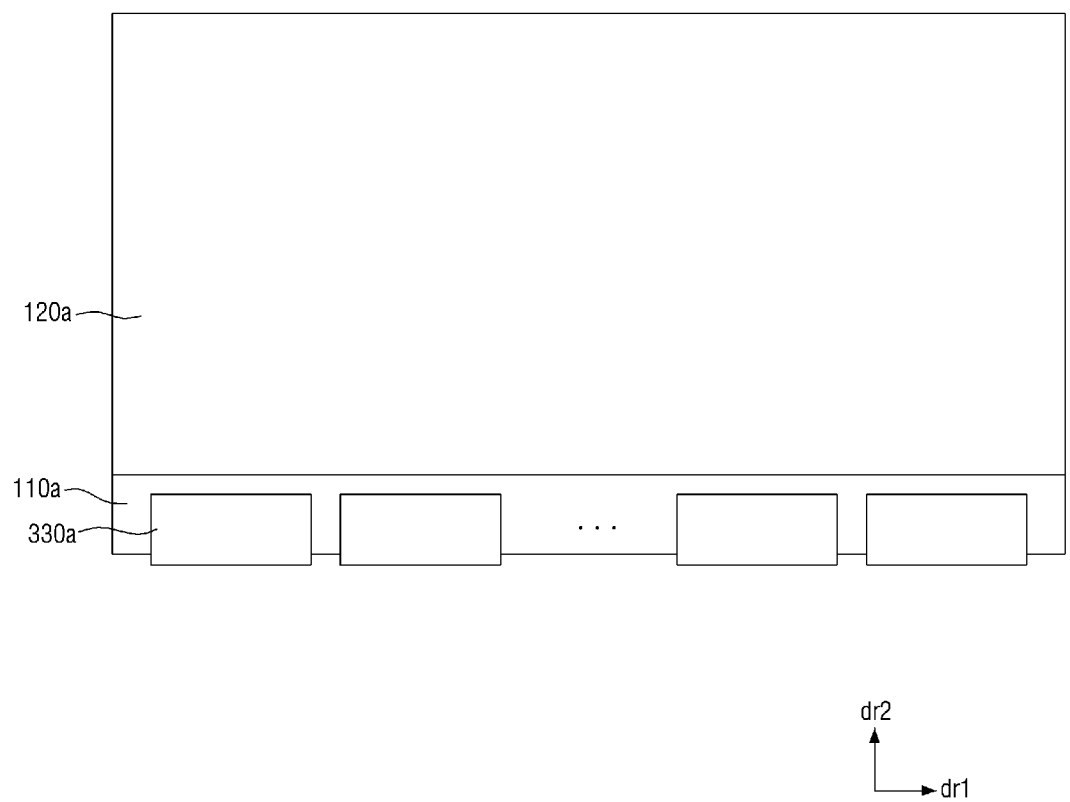
FIG. 20 is a plan view of the display device shown in FIG. 18 as viewed from above a second substrate.

FIG. 18 is a perspective view of an area of a display device according to another exemplary embodiment of the invention, the area corresponding to the area B of FIG. 12, FIG. 19 is a sectional view taken along line VII-VII' of FIG. 18, and FIG. 20 is a plan view of the display device shown in FIG. 18 as viewed from above a second substrate.

The display device according to the exemplary embodiment is different from the display device according to the exemplary embodiment shown in FIGS. 12 to 15 in that it further includes a third adhesive layer 720a, but does not include the first adhesive layer 420a, the second adhesive layer 520a, the protective film 410a, and the chassis member 510a. Accordingly, in the exemplary embodiment, the third adhesive layer 720a will be mainly described, and a description of other components will be omitted or simplified. The reference numerals shown in FIGS. 12 to 15 will be applied to reference numerals which are not explained in the exemplary embodiment.

Referring to FIGS. 18 to 20, the display device according to the exemplary embodiment includes a first substrate 110a, a second substrate 120a, a backlight unit 200a, a conductive pad 310a, and a flexible circuit film 330a.

The flexible circuit film 330a may be connected with the conductive pad 310a through the anisotropic conductive film 320a, but unlike the display device according to the exemplary embodiment shown in FIGS. 12 to 15, may be attached and fixed to the backlight unit 200a by the third adhesive layer 720a.

In particular, the third adhesive layer 720a may adhere not only to the lateral side of the backlight unit 200a, but also to a part of the lateral side of the first substrate 110a. Thus, the flexible circuit film 330a and the first substrate 110a may be fixed. As a result, the first substrate 110a and the backlight unit 200a may be fixed by the flexible circuit film 330a. Here, the third adhesive layer 720a may be a double-sided tape.

That is, according to the exemplary embodiment, even when the first substrate 110a is not completely overlapped by the second substrate 120a and the flexible circuit film 330a is bent, the same effect as the exemplary embodiment shown in FIGS. 9 to 11 may be obtained.

Figure 21:
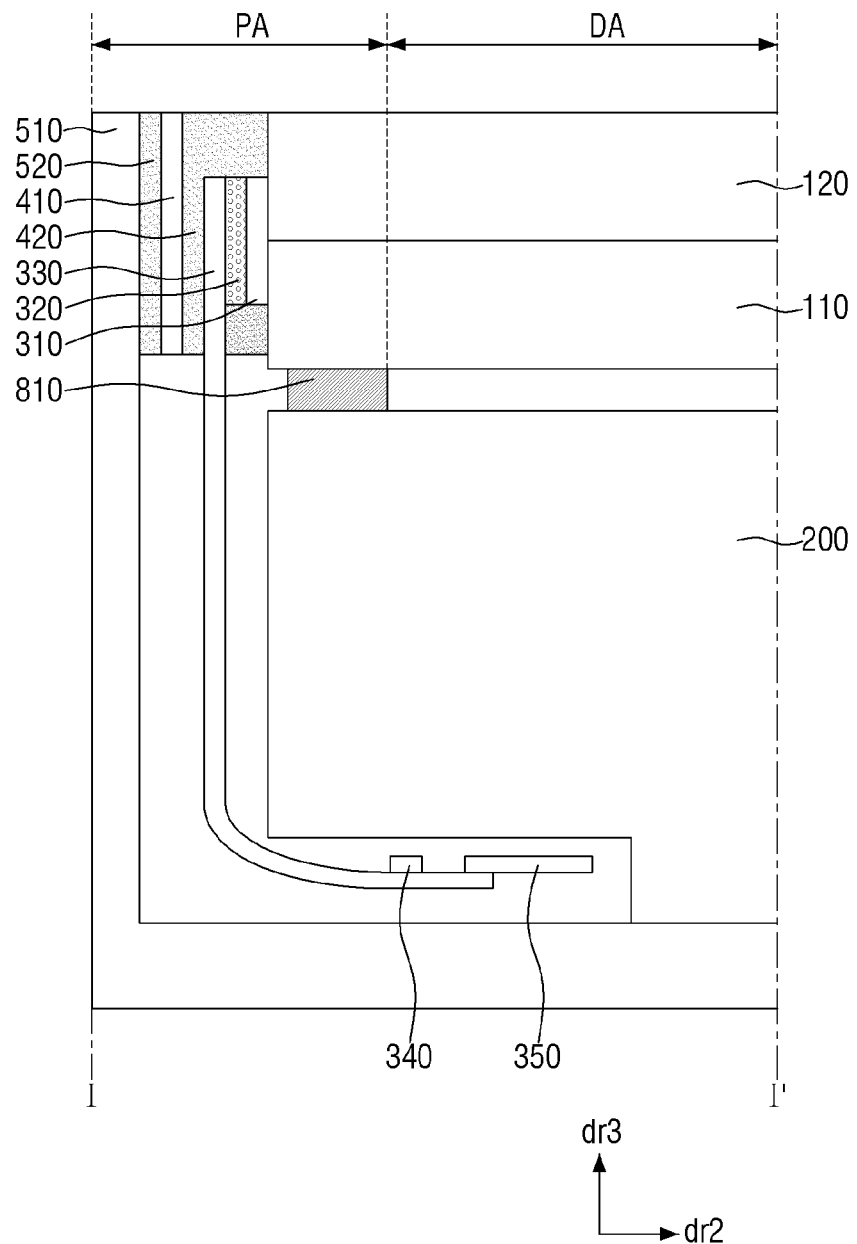
FIG. 21 is a sectional view of another exemplary embodiment of a display device according to the invention, taken along a line corresponding to line I-I' of FIG. 2.
Figure 22:
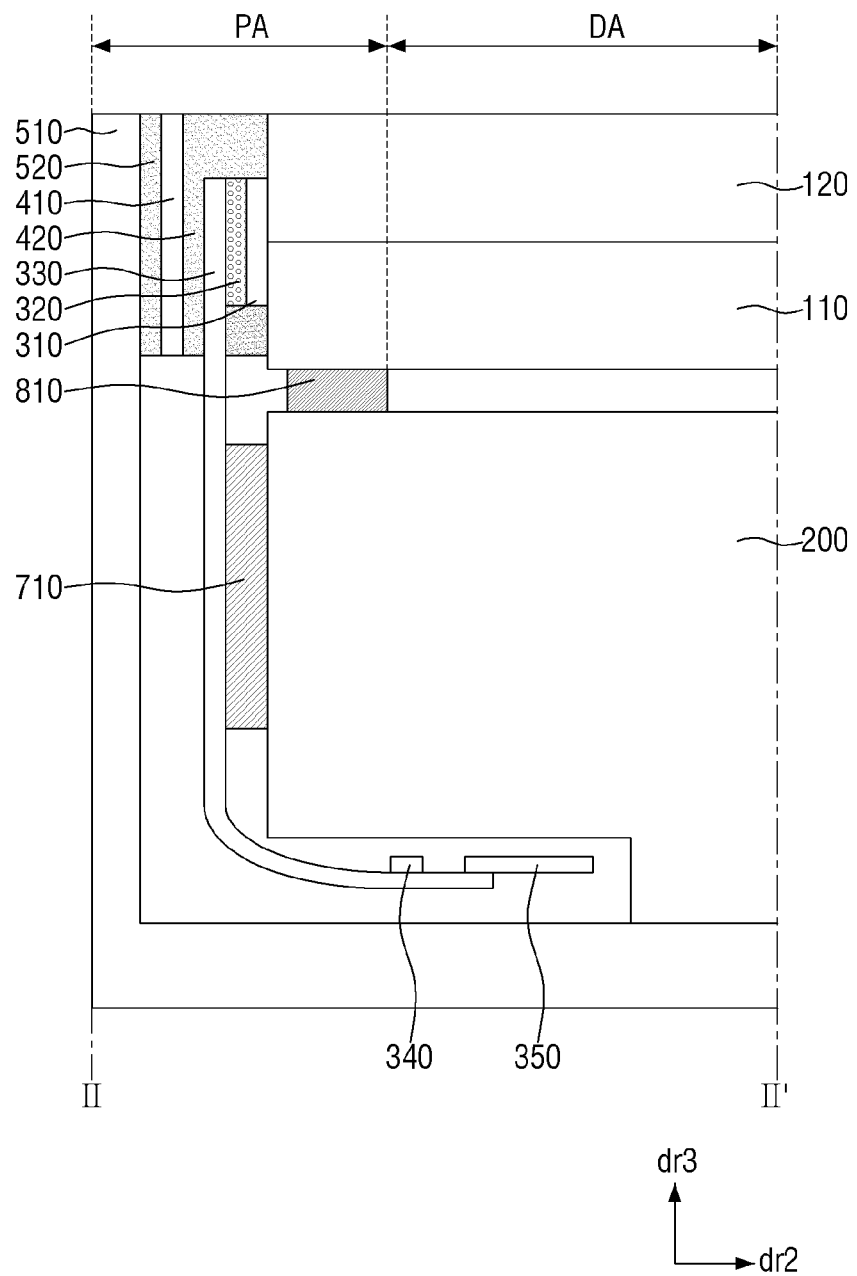
FIG. 22 is a sectional view of another exemplary embodiment of a display device according to the invention, taken along a line corresponding to line II-II' of FIG. 7.
Figure 23:
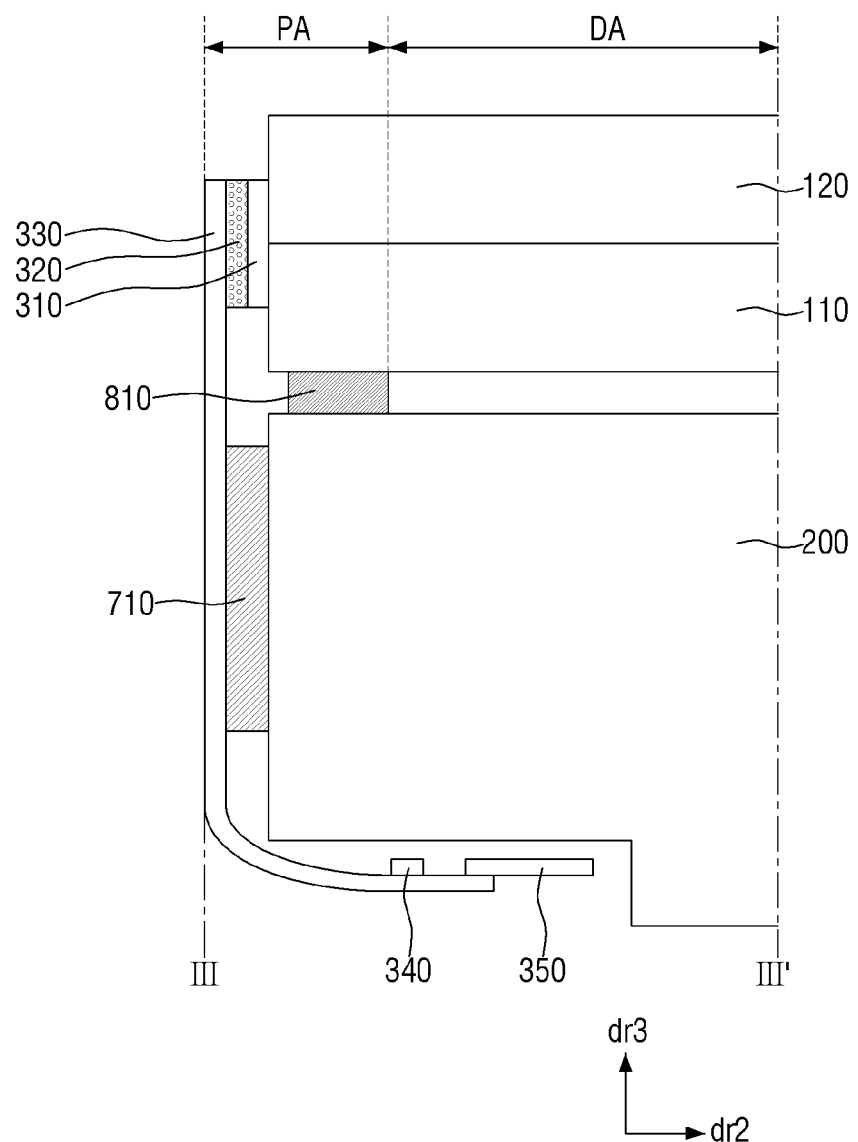
FIG. 23 is a sectional view of another exemplary embodiment of a display device according to the invention, taken along a line corresponding to line III-III' of FIG. 9.

FIG. 21 is a sectional view of a display device according to another exemplary embodiment of the invention, taken along a line corresponding to the line I-I' of FIG. 2, FIG. 22 is a sectional view of a display device according to another exemplary embodiment of the invention, taken along a line corresponding to the line III-III' of FIG. 7, and FIG. 23 is a sectional view of a display device according to another exemplary embodiment of the invention, taken along a line corresponding to the line IV-IV' of FIG. 9.

The display devices according to exemplary embodiments shown in FIGS. 21 to 23 are different from the display device according to the exemplary embodiment shown in FIGS. 1 to 4 in that each of these display devices further includes a fourth adhesive layer 810. Accordingly, in the exemplary embodiment, the fourth adhesive layer 810 will be mainly described, and a description of other components will be omitted or simplified. The reference numerals shown in FIGS. 1 to 4 will be applied to reference numerals which are not explained in the exemplary embodiments.

Referring to FIGS. 21 to 23, each of the display devices according to the exemplary embodiments further includes a fourth adhesive layer 810. The fourth adhesive layer 810 may be disposed on one side of the second substrate 120 in a direction opposite to the direction in which the first substrate 110 is disposed, and may be provided in the non-display area PA. The fourth adhesive layer 810 may serve to adhere and fix the second substrate 120 and the backlight module. The fourth adhesive layer 810 may be provided by applying an adhesive and then curing the adhesive. However, the invention is not limited thereto, and the fourth adhesive layer 810 may include a double-sided tape.

Therefore, in the case of the exemplary embodiment shown in FIG. 21, since the first substrate 110, the second substrate 120, and the backlight unit 200 are fixed by the chassis member 510 and may also be fixed by the fourth adhesive layer 810, durability may be further increased.

Further, in the case of the exemplary embodiment shown in FIG. 22, since all of the fixation of the first substrate 110, the second substrate 120 and the backlight unit 200 by the chassis member 510, the fixation of the first substrate 110, the second substrate 120 and the backlight unit 200 by the flexible circuit film 330, and the fixation of the first substrate 110, the second substrate 120 and the backlight unit 200 by the fourth adhesive layer 810 are performed, durability may be most excellent.

Furthermore, in the case of the exemplary embodiment shown in FIG. 23, since the first substrate 110, the second substrate 120, and the backlight unit 200 are fixed by the flexible circuit film 330 and may also be fixed by the fourth adhesive layer 810, durability may be further increased.

Figure 24:
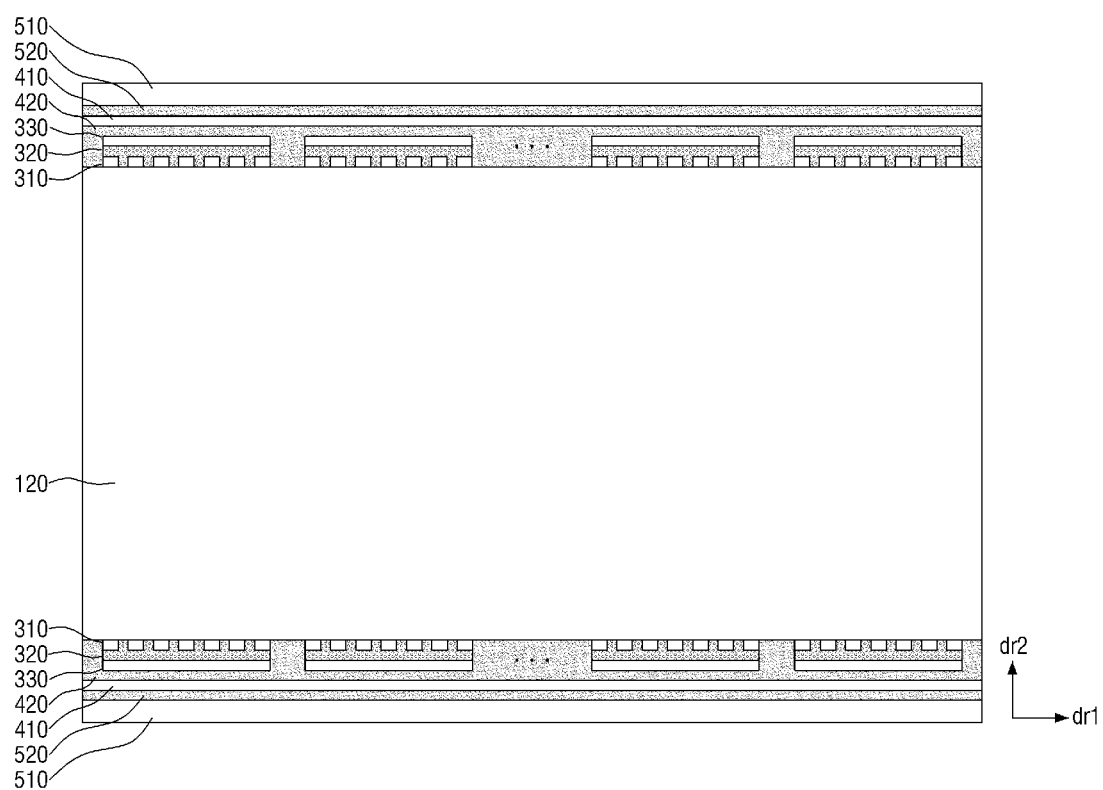
FIGS. 24 to 26 are plan views of different exemplary embodiments of respective display devices according to the invention as viewed from above a second substrate.
Figure 25:
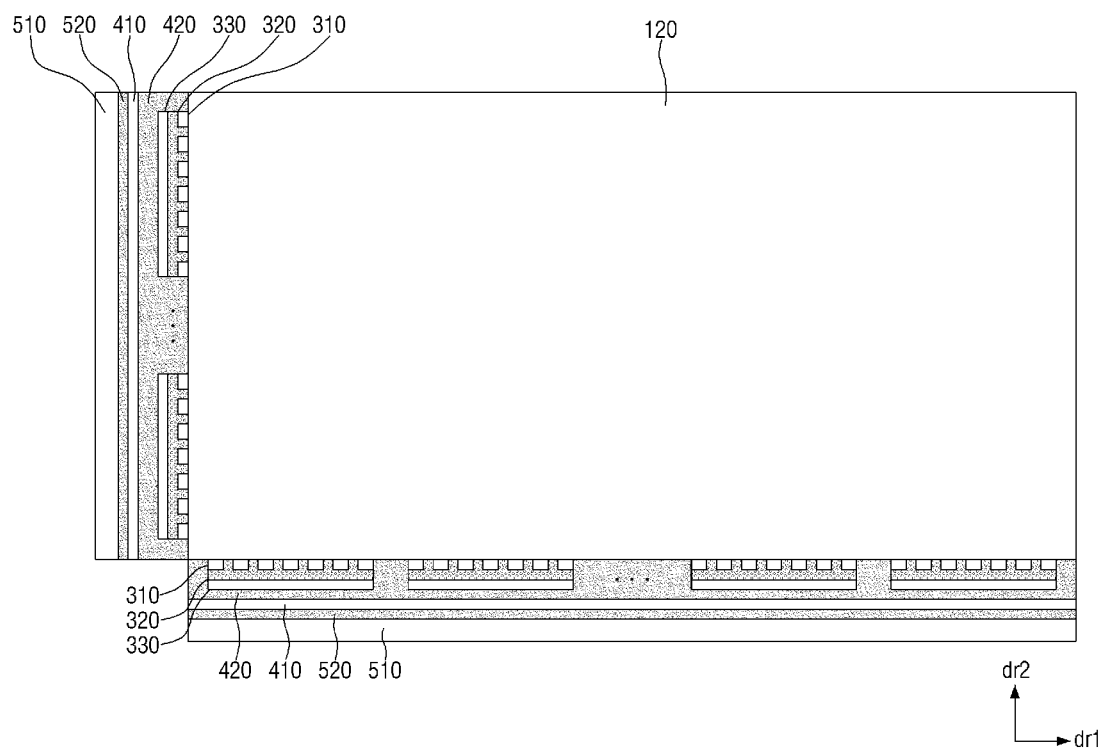
Figure 26:
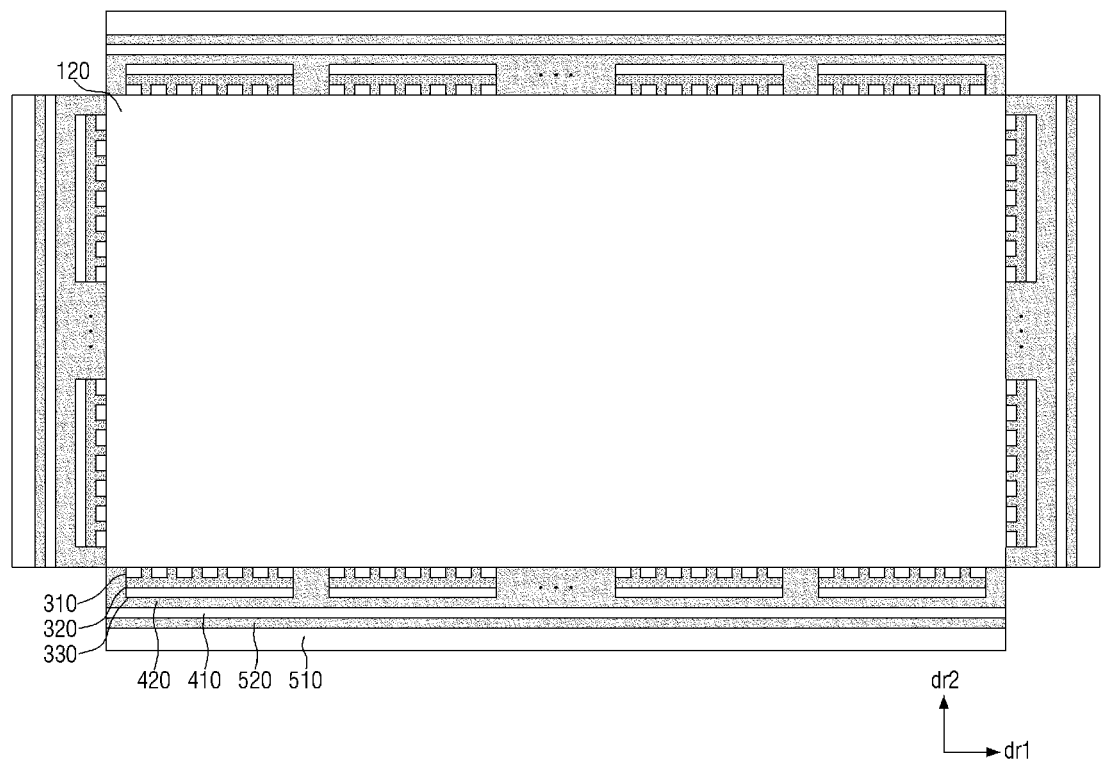

FIGS. 24 to 26 are plan views of respective display devices according to different exemplary embodiments of the invention as viewed from above a second substrate.

The display devices according to exemplary embodiments shown in FIGS. 24 to 26 are different from the display device according to the exemplary embodiment shown in FIGS. 1 to 4 in that the flexible circuit film 330 is disposed on a relatively large number of lateral sides of the first substrate 110 and the second substrate 120. Accordingly, the area where the flexible circuit film 330 is disposed will be mainly described, and a description of other components will be omitted or simplified. The reference numerals shown in FIGS. 1 to 4 will be applied to reference numerals which are not explained in the exemplary embodiments.

First, referring to FIG. 24, the conductive pads 310, the flexible circuit films 330, the protective films 410, and the chassis members 510 may be disposed on both lateral sides of the second substrate 120 in the second direction dr2 and in a direction opposite to the second direction dr2, respectively. Similarly, although not shown in the drawing, the conductive pads 310, the flexible circuit films 330, the protective films 410, and the chassis members 510 may also be disposed on both lateral sides of the second substrate 120 in the first direction dr1 and in a direction opposite to the first direction dr1, respectively.

Next, referring to FIG. 25, the conductive pads 310, the flexible circuit films 330, the protective films 410, and the chassis members 510 may be disposed on one lateral side of the second substrate 120 in the second direction dr2 and one lateral side of the second substrate 120 in a direction opposite to the first direction dr1, respectively. Similarly, although not shown in the drawing, the conductive pads 310, the flexible circuit films 330, the protective films 410, and the chassis members 510 may also be disposed on one lateral side of the second substrate 120 in the first direction dr1 and one lateral side of the second substrate 120 in a direction opposite to the second direction dr2, respectively.

Next, referring to FIG. 26, the conductive pads 310, the flexible circuit films 330, the protective films 410, and the chassis members 510 may be disposed on all lateral sides of the second substrate 120.

That is, the conductive pads 310, the flexible circuit films 330, the protective films 410, and the chassis members 510 may be disposed on one lateral side of the second substrate 120, two lateral sides thereof, or all lateral sides thereof. The arrangement type thereof may be freely designed without limitation.

The technical ideas of the invention according to the exemplary embodiments shown in FIGS. 21 to 26 may be equally applied to the structure according to the exemplary embodiments shown in FIGS. 12 to 20, that is, the structure where the first substrate is provided to have a larger area than the second substrate.

As described above, according to the exemplary embodiments of the invention, there may be provided a display device that does not deteriorate the durability of a wiring, a driving circuit, or the like located in a non-display area, while realizing a thin bezel.

Further, there may be provided a display device that is easy to re-assemble when a failure occurs, while realizing a thin bezel.

The effects of the invention are not limited by the foregoing, and other various effects are anticipated herein.

Although the preferred exemplary embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
   a first substrate and a second substrate facing each other;
   a plurality of pixels disposed between the first substrate and the second substrate;
   a plurality of conductive pads which transmits signals to the plurality of pixels;
   a flexible circuit film connected with the plurality of conductive pads;
   a protective film disposed on the flexible circuit film on lateral sides of the first substrate and the second substrate; and
   a chassis member disposed on the protective film on the lateral sides of the first substrate and the second substrate,
   wherein the flexible circuit film and the protective film are attached by a first adhesive layer disposed on both major opposing surface planes defining the flexible circuit film.

2. The display device of claim 1,
   wherein the plurality of conductive pads is disposed on the lateral sides of the first substrate and the second substrate.

3. The display device of claim 1,
   wherein the protective film and the chassis member are attached by a second adhesive layer which is different from the first adhesive layer.

4. The display device of claim 3,
   wherein an adhesive force of the first adhesive layer is greater than an adhesive force of the second adhesive layer.

5. The display device of claim 4,
   wherein the adhesive force of the first adhesive layer is equal to or greater than 1500 gram-force per centimeter.

6. The display device of claim 3,
   wherein the first adhesive layer blocks light transmission.

7. The display device of claim 3,
   wherein the first adhesive layer includes an adhesive-coated layer.

8. The display device of claim 7,
   wherein the second adhesive layer includes a double-sided tape.

9. The display device of claim 3,
   wherein the first adhesive layer is disposed on a part of an area of the lateral sides of the first substrate and the second substrate, the area being not provided with the flexible circuit film and the conductive pads.

10. The display device of claim 3,
    wherein the flexible circuit film and the plurality of conductive films are attached by an anisotropic conductive film.

11. A display device, comprising:
    a first substrate and a second substrate facing each other;
    a plurality of pixels disposed between the first substrate and the second substrate;
    a plurality of conductive pads which transmits signals to the plurality of pixels;
    a flexible circuit film connected with the plurality of conductive pads;
    a protective film disposed on the flexible circuit film on lateral sides of the first substrate and the second substrate; and
    a chassis member disposed on the protective film on the lateral sides of the first substrate and the second substrate, wherein the flexible circuit film and the plurality of conductive films are attached by an anisotropic conductive film, and wherein a thickness of the first adhesive layer disposed to be in contact with the lateral sides of the first substrate and the second substrate is greater than a sum of a thickness of the flexible circuit film, a thickness of a conductive pad of the plurality of conductive pads, and a thickness of the anisotropic conductive film.

12. The display device of claim 1, wherein the protective film is disposed on at least one of the lateral sides provided by the first substrate and the second substrate.

13. The display device of claim 1, further comprising:

a backlight unit disposed on one side of the second substrate facing the first substrate, wherein the flexible circuit film and the backlight unit are attached by a third adhesive layer.

14. The display device of claim 13, wherein the third adhesive layer includes a double-sided tape.

15. The display device of claim 13, wherein the second substrate and the backlight unit are attached by a fourth adhesive layer disposed on one side of the second substrate facing the first substrate.

16. A display device, comprising:

a first substrate and a second substrate facing each other;

a plurality of pixels disposed between the first substrate and the second substrate;

a plurality of conductive pads which transmits signals to the plurality of pixels;

a backlight unit disposed on one side of the second substrate facing the first substrate; and a flexible circuit film connected with the plurality of conductive pads, wherein the flexible circuit film and the plurality of conductive pads are attached by an anisotropic conductive film, and the flexible circuit film and the backlight unit are attached by an adhesive layer.

17. The display device of claim 16, wherein the adhesive layer includes a double-sided tape.

18. The display device of claim 16, wherein the first substrate, the second substrate, and the backlight unit are fixed by the flexible circuit film.

19. The display device of claim 16, wherein a length of the adhesive layer measured along a thickness direction of the first substrate and the second substrate is greater than a sum of a thickness of the first substrate and a thickness of the second substrate.

20. The display device of claim 16, further comprising:

a protective tape overlapping lateral sides of the first substrate and the second substrate and a lateral side of the backlight unit.

\* \* \* \* \*